US012269268B2

(12) United States Patent
Moore et al.

(10) Patent No.: US 12,269,268 B2
(45) Date of Patent: Apr. 8, 2025

(54) NOZZLE PLATE COMPRISING BOROSILICATE GLASS

(71) Applicant: AXALTA COATING SYSTEMS IP CO., LLC, Wilmington, DE (US)

(72) Inventors: John R. Moore, Lansdale, PA (US); Shih-Wa Wang, Glen Mills, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 122 days.

(21) Appl. No.: 18/246,764

(22) PCT Filed: Sep. 28, 2021

(86) PCT No.: PCT/US2021/071612

§ 371 (c)(1),
(2) Date: Mar. 27, 2023

(87) PCT Pub. No.: WO2022/067350

PCT Pub. Date: Mar. 31, 2022

(65) Prior Publication Data

US 2023/0364909 A1 Nov. 16, 2023

Related U.S. Application Data

(60) Provisional application No. 63/084,410, filed on Sep. 28, 2020.

(51) Int. Cl.
*B41J 2/14* (2006.01)
*B41J 2/16* (2006.01)

(52) U.S. Cl.
CPC ........... *B41J 2/1433* (2013.01); *B41J 2/1623* (2013.01); *B41J 2/1628* (2013.01); *B41J 2/1629* (2013.01);

(Continued)

(58) Field of Classification Search
CPC ...... B41J 2/1433; B41J 2/1623; B41J 2/1628; B41J 2/1629; B41J 2/1631; B41J 2/1637; B41J 2202/03; B41J 2/162
See application file for complete search history.

(56) References Cited

U.S. PATENT DOCUMENTS 4,851,460 A 7/1989 Stranghoener et al.
5,342,882 A 8/1994 Goebel et al.

(Continued)

FOREIGN PATENT DOCUMENTS

CN 102933754 A 2/2013
CN 103303016 A 9/2013

(Continued)

OTHER PUBLICATIONS

EPO, International Search Report issued in IA No. PCT/US2021/071612, dated Jan. 26, 2022.

(Continued)

*Primary Examiner* — Bradley W Thies
(74) *Attorney, Agent, or Firm* — Lorenz & Kopf, LLP

(57) ABSTRACT

A nozzle plate defines at least one nozzle connected to the nozzle plate at a base, wherein the at least one nozzle has a height and a top having an inner width and an outer width, wherein a ratio of the height to the inner width is greater than 5, and wherein the nozzle plate comprises a borosilicate glass. The nozzle plate is formed via a method including providing a silicon wafer having a surface; providing a borosilicate glass wafer having a surface; etching the surface of the silicon wafer to form a plurality of trenches in the surface; anodically bonding the etched surface of the silicon wafer to the surface of the borosilicate glass wafer to form a two layer composite; heating the two layer composite at a (Continued)

temperature of at least about 750° C.; and releasing the silicon wafer from the borosilicate glass to form the nozzle plate.

15 Claims, 6 Drawing Sheets

(52) U.S. Cl.
CPC .......... *B41J 2/1631* (2013.01); *B41J 2/1637* (2013.01); *B41J 2202/03* (2013.01)

(56) References Cited

U.S. PATENT DOCUMENTS

| | | | |
|---|---|---|---|
| 5,453,451 A | 9/1995 | Sokol | |
| 5,773,487 A | 6/1998 | Sokol | |
| 5,830,937 A | 11/1998 | Shalov et al. | |
| 6,861,495 B2 | 3/2005 | Barsotti et al. | |
| 2004/0217202 A1 | 11/2004 | Hynes | |
| 2007/0200898 A1 * | 8/2007 | Ueno | B41J 2/04581 347/55 |
| 2010/0048811 A1 | 2/2010 | Chilla et al. | |
| 2011/0134188 A1 | 6/2011 | Arakawa | |

FOREIGN PATENT DOCUMENTS

| | | | |
|---|---|---|---|
| CN | 103466955 | A | 12/2013 |
| CN | 107574407 | A | 1/2018 |
| EP | 1253626 | A2 | 10/2002 |
| EP | 1550554 | A4 | 8/2008 |
| EP | 1797961 | A4 | 4/2009 |
| JP | 2004136657 | A | 5/2004 |
| JP | 2006297754 | A | 11/2006 |
| WO | 02077109 | A2 | 10/2002 |
| WO | 2006118974 | A1 | 11/2006 |
| WO | 2008124136 | A1 | 10/2008 |
| WO | 2008124137 | A1 | 10/2008 |
| WO | 2008124141 | A1 | 10/2008 |

OTHER PUBLICATIONS

Amnache, A. et al. "Capabilities and Limits to Form High Aspect-Ratio Microstructures by Molding of Borosilicate Glass", Journal of Microelectromechanical Systems, Jun. 2019, pp. 432-440, vol. 28, No. 3.

Lee, K.I., et al. "Multi Nozzle Electrohydrodynamic Inkjet Printing Head by Batch Fabrication", 2013 IEEE 26th International Conference on Micro Electro Mechanical Systems (MEMS), pp. 1165-1168.

Takahashi, T. et al., "Effect of Nozzle Length on Breakup Length of Liquid Jet", Memoirs of the School of Engineering, Sep. 1969, vol. 4, No. 1, Okayama University.

Trott, Dr. G.R. et al., "Glass Wafer Mechanical Properties: A Comparison to Silicon", Corning Incorporated, Corning, New York 14831.

* cited by examiner

NOZZLE PLATE COMPRISING BOROSILICATE GLASS

CROSS-REFERENCE TO RELATED APPLICATIONS

This application is a U.S. National-Stage entry under 35 U.S.C. § 371 based on International Application No. PCT/US2021/71612, filed Sep. 28, 2021, which was published under PCT Article 21(2) and which claims the benefit of U.S. Provisional Application No. 63/084,410, filed Sep. 28, 2020, which is incorporated by reference herein in its entirety.

TECHNICAL FIELD

The present disclosure generally relates to a nozzle plate, a method of forming the plate, and a method of jetting a fluidic material using the nozzle plate. More particularly, the nozzle plate includes a borosilicate glass and at least one nozzle having a high aspect ratio that is used to jet a fluidic material that does not break apart into individual droplets before contacting a substrate.

BACKGROUND

The silicon industry is built on the extreme uniformity, chemical, and mechanical strength of silicon crystals configured in the shape of a wafer for many applications. Silicon can be an ideal substrate for creating electronic structures such as transistors. For example, thinning a silicon integrated circuit substrate has now become a common process approach to maintain the trend established by Moore's law and to meet the packaging form factor required by consumer applications. A thinned silicon wafer can be used in a stand-alone thin form factor package or combined with other thinned silicon device wafers to create three dimensional structures. However, thinned silicon wafers are very difficult to handle and generally require use of a carrier substrate attached with a temporary bonding method as an aid to handling.

As related to the field of direct printing, there are several applications using piezoelectric inkjet printing processes. However, conventional piezoelectric inkjet printing technology has several problems such as nozzle clogging, limited viscosity range of ink, and difficulty for printing of continuous lines. Multi nozzle electrohydrodynamic (EHD) printing gathered much attention for higher resolution compared to traditional piezoelectric inkjet technology wherein various materials have been fabricated by EHD printing technology. One example of typical EHD printing is set forth in FIG. 2. High speed drop-on-demand (DOD) printing up to 1 kHz has also been demonstrated. For example, glass capillaries or metallic tubes can be used because a sharp shape of capillaries is required for the strong field concentration at the end of the capillaries. However, the throughput of EHD printing process with a single capillary is not enough for commercialization. As a result, multi nozzle printing modules composed of capillaries are not practical to assemble with high position accuracy for use in commercial applications. In an attempt to remedy these deficiencies, silicon based micromachined nozzles for EHD printing can be formed using deep silicon etching processes. However, stable jetting is not obtained due to the electrical conductance of silicon, which reduces the concentration of the electric field at the meniscus. Also, the bias voltage required to eject droplets from the nozzle is higher than several kV. Even further, silicon structures are extremely fragile and cannot be easily disassembled and cleaned without breakage, thereby rendering them unusable.

Glass is a known complement to silicon as a material for MEMS, microfluidics and packaging due to its useful properties, such as strength, optical transparency, chemical stability, thermal insulation and electrical isolation. As just one example, glass wafers tend to have superior edge strength when compared to silicon wafers, as shown in FIG. 1. Borosilicate glass, in particular, also has a thermal expansion coefficient similar to silicon, offering the possibility of bonding glass and silicon wafers. Wet etching of borosilicate glass using hydrofluoric acid solution (HF) is a cost-effective process and provides a high-etch rate and smooth surfaces. However, the isotropic etch profile prevents the use of this technique to create vertical and high aspect ratio structures commonly formed with silicon. Therefore, the formation of the printing structures described above are not achievable. Fabrication of deep glass microstructures using fluorine based plasma etching methods has shown promising results, by using inductively coupled plasma reactive ion etching (ICP-RIE) or magnetic neutral loop discharge (NLD). However, combining vertical sidewall profiles, high aspect-ratios and smooth surfaces for formation of three dimensional structures remains a challenge. Furthermore, relatively thick metal masks are typically required for such techniques which is expensive and cumbersome. Glass molding is an alternative approach to form glass microstructures. However, there are problems associated with full filling of mold cavities, sensitive process conditions, and limits on forming structures with high aspect ratios. In addition, there is no quantitative understanding of how non-uniform velocities of molten glass flow in and through mold cavities of varying widths. Therefore, there are many challenges to be overcome.

In an attempt to remedy these deficiencies, the art describes a single nozzle printing head with a batch processed glass nozzle. However, this same art reports that it was not able to achieve as high an aspect ratio with the glass as is achieved when using silicon. In fact, the art tested several etching process unsuccessfully. For example, wet etching was tested but the angle of the etched wall was too low. Dry etching process with a metal mask was also tested but the process time is too long. Sandblasting was also evaluated but still could not produce high aspect ratios. Therefore, such processes are not suitable for creation of printing technology.

Accordingly, there remains opportunity for improvement. Furthermore, other desirable features and characteristics of the present disclosure will become apparent from the subsequent detailed description of the disclosure and the appended claims, taken in conjunction with the accompanying drawings and this background of the disclosure.

BRIEF SUMMARY

This disclosure provides a nozzle plate defining at least one nozzle connected to the nozzle plate at a base, wherein the at least one nozzle has a height and a top having an inner width and an outer width, wherein a ratio of the height to the inner width is greater than 5, and wherein the nozzle plate comprises a borosilicate glass.

This disclosure also provides a method of making a nozzle plate wherein the method includes the steps of providing a silicon wafer having a surface; providing a borosilicate glass wafer having a surface; etching the surface of the silicon wafer to form a plurality of trenches in the surface; anodically bonding the etched surface of the silicon wafer to the surface of the borosilicate glass wafer to form a two layer composite; heating the two layer composite at a temperature of at least about 750° C. to soften the borosilicate glass wafer to a molten state such that molten borosilicate glass flows into the plurality of trenches to form a plurality of nozzles; and releasing the silicon wafer from the borosilicate glass to form the nozzle plate having the plurality of nozzles, wherein the nozzle plate defines at least one nozzle connected to the nozzle plate at a base, wherein the at least one nozzle has a height and a top having an inner width and an outer width, wherein a ratio of the height to the inner width is greater than about 3, and wherein the nozzle plate comprises a borosilicate glass.

This disclosure also provides a method of jetting a fluidic material through a nozzle plate and onto a substrate, wherein the method includes the steps of providing a nozzle plate defining at least one nozzle connected to the nozzle plate at a base, wherein the at least one nozzle has a height and a top having an inner width and an outer width, wherein a ratio of the height to the inner width is greater than about 3, and wherein the nozzle plate comprises a borosilicate glass; and jetting the fluidic material through the at least one nozzle to form a jet of the fluidic material that contacts the substrate disposed at a distance (D) from the nozzle, wherein the jet has a breakup length that is greater than the distance (D) such that the jet does not break apart into individual droplets before contacting the substrate.

BRIEF DESCRIPTION OF THE DRAWINGS

The present disclosure will hereinafter be described in conjunction with the following drawing figures, wherein like numerals denote like elements, and.

DETAILED DESCRIPTION

Figure 1:
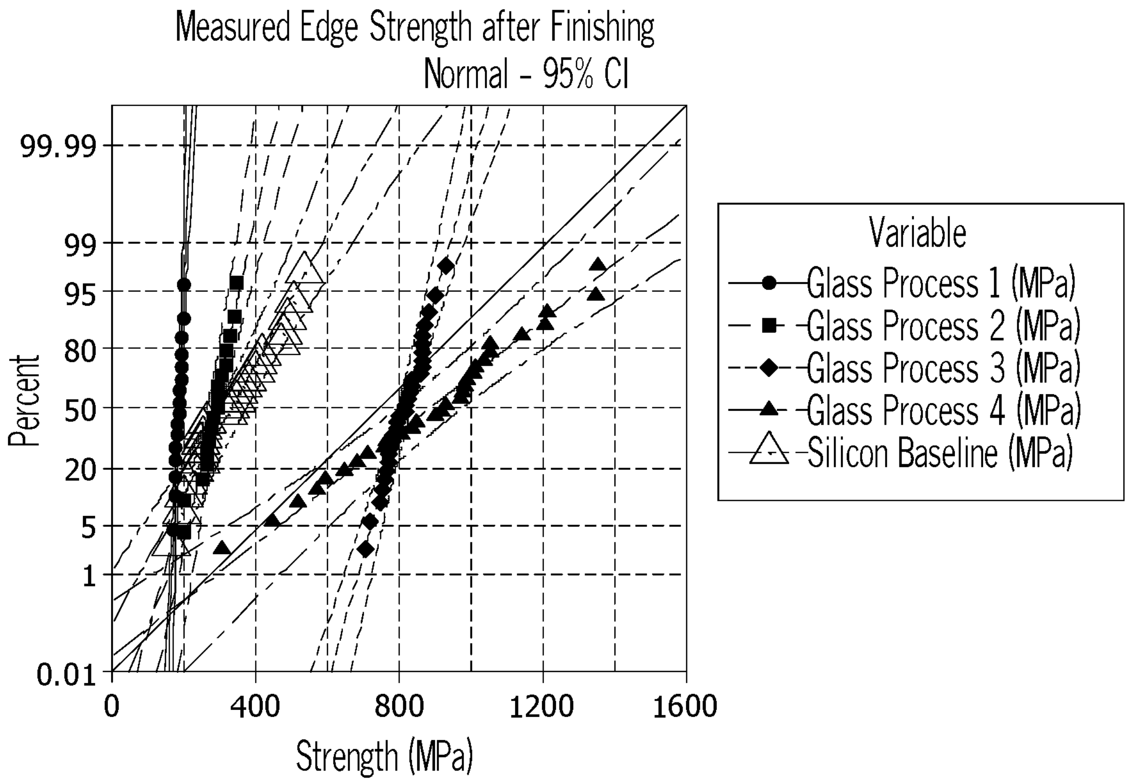
FIG. 1 is a line graph of measured edge strength (MPa) after finishing as a function of percent showing that glass is generally stronger than silicon.
Figure 2:
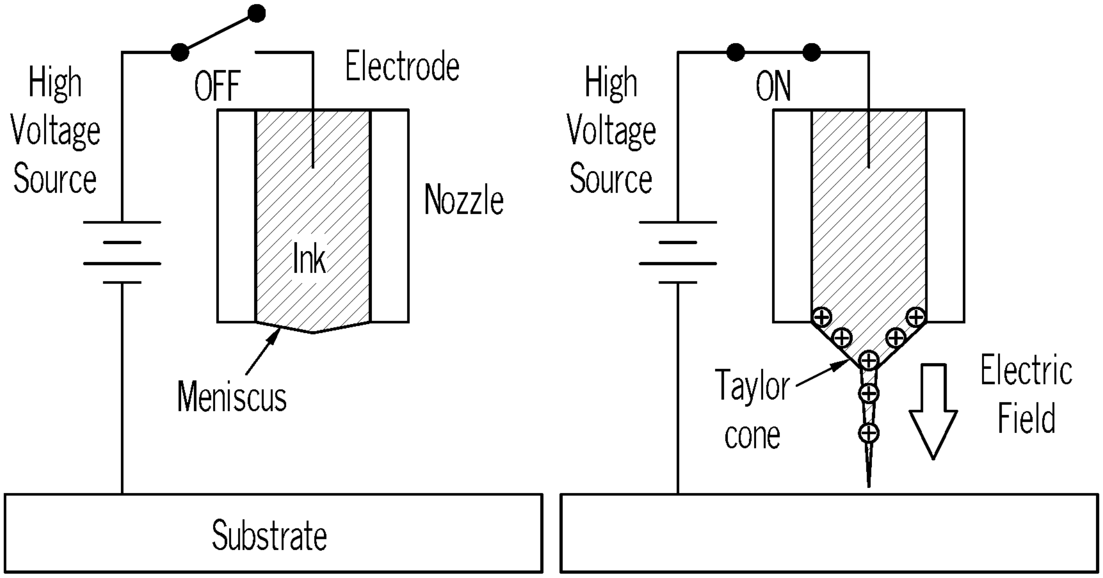
FIG. 2 is a schematic that shows principles of electrohydrodynamic (EHD) printing processes.

The following detailed description is merely exemplary in nature and is not intended to limit the nozzle plate or method of this disclosure. Furthermore, there is no intention to be bound by any theory presented in the preceding background or the following detailed description.

Embodiments of the present disclosure are generally directed to nozzle plates and methods for fabricating the same. For the sake of brevity, conventional techniques related to nozzle plates and jetting fluidic materials therethrough may not be described in detail herein. Moreover, the various tasks and process steps described herein may be incorporated into a more comprehensive procedure or process having additional steps or functionality not described in detail herein. In particular, various steps in the manufacture of jetting systems are well-known and so, in the interest of brevity, many conventional steps will only be mentioned briefly herein or will be omitted entirely without providing the well-known process details.

This disclosure provides a nozzle plate (20) defining at least one nozzle (24) connected to the nozzle plate (20) at a base (22). The at least one nozzle (24) has a height (H) and a top (30) having an inner width (Wi) and an outer width (Wo), wherein a ratio of the height (H) to the inner width (Wi) is greater than 5, and wherein the nozzle plate (20) comprises a borosilicate glass, e.g. as shown in at least FIGS. 4 and 7.

The nozzle plate (20) itself is not particularly limited and may be any known in the art. The nozzle plate (20) is not limited relative to length, width, or thickness. However, in various embodiments, the nozzle plate (20) has a length of from about 0.5 to about 6, about 1 to about 5, about 2 to about 4, or at least about 0.5, 1, 1.5, 2, 2.5, 3, 3.5, 4, 4.5, 5, 5.5, or greater, inches. In other embodiments, the nozzle plate (20) has a width of from about 0.1 to about 1, about 0.2 to about 0.0, about 0.3 to about 0.8, about 0.4 to about 0.7, about 0.5 to about 0.6, or at least about 0.1, 0.2, 0.3, 0.4, 0.5, 0.6, 0.7, 0.8, 0.9, or 1, inches. In other embodiments, the nozzle plate (20) has a thickness of from about 50 to about 2000, about 100 to about 1950, about 150 to about 1900, about 200 to about 1850, about 250 to about 1800, about 300 to about 1750, about 350 to about 1700, about 400 to about 1650, about 450 to about 1600, about 500 to about 1550, about 550 to about 1500, about 600 to about 1450, about 650 to about 1400, about 700 to about 1350, about 750 to about 1300, about 800 to about 1250, about 850 to about 1200, about 900 to about 1150, about 950 to about 1100, about 1000 to about 1050, or at least about 50, 100, 150, 200, 250, 300, 350, 400, 450, 500, 550, 600, 650, 700, 750, 800, 850, 900, 950, 1000, 1250, 1500, 1750, 2000, micrometers. Typically, thickness is defined as a total thickness of the nozzle plate (20) including to the top (30) of the at least one nozzle (24). Alternatively, thickness may be defined as just the thickness of the nozzle plate (20) from a bottom (34) to a base (22) of the at least one nozzle (24). In various non-limiting embodiments, all values and ranges of values, both whole and fractional, including and between those set forth above are hereby expressly contemplated for use.

Figure 3A:
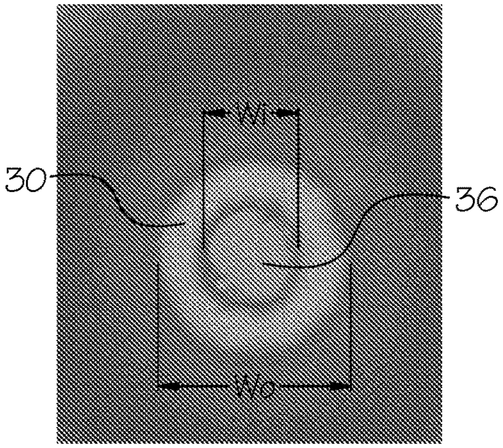
FIG. 3A is a top view of a top of a nozzle of the instant disclosure that is approximately circular.
Figure 4:
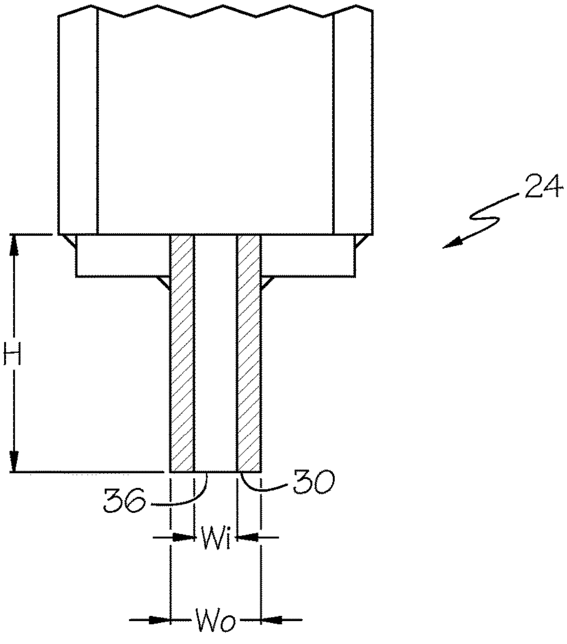
FIG. 4 is a side cross-sectional view of an embodiment of a nozzle of this disclosure showing height (H), inner width (Wi), and outer width (Wo)
Figure 7:
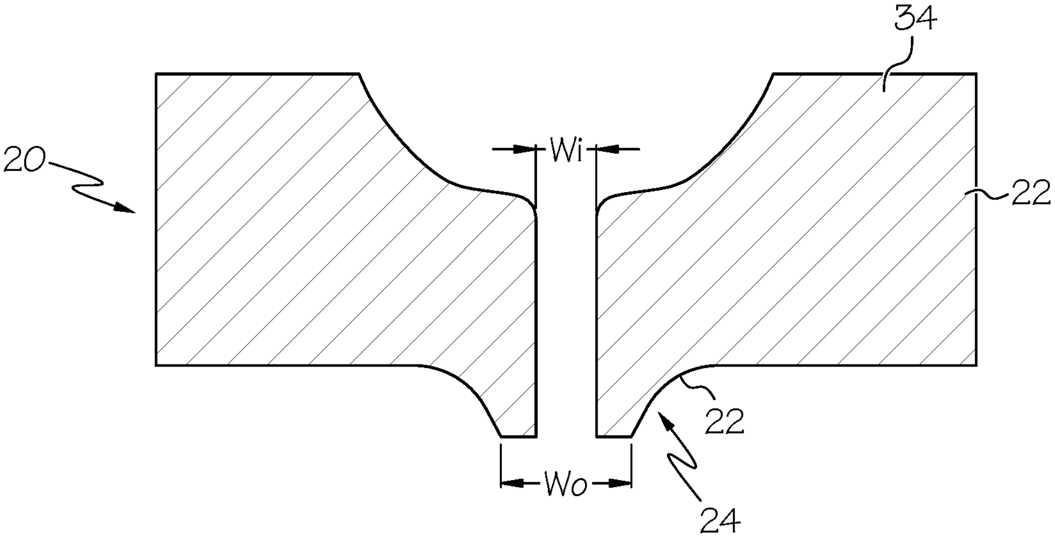
FIG. 7 is a side cross-sectional view of an embodiment of the nozzle of the instant disclosure.

The nozzle plate (20) defines at least one nozzle (24) connected to the nozzle plate (20) at a base (22). The at least one nozzle (24) has a height (H) and a top (30) having an inner width (Wi) and an outer width (Wo), e.g. as shown in FIGS. 4 and 7. One example of a top (30) of the at least one nozzle (24) is set forth in FIG. 3A. Each of the at least one nozzles (24) connects to the nozzle plate (20) at the base (22) of the at least one nozzle (24). The base (22) is not particularly limited in size and may be the same, greater, or less than the inner and/or outer widths (Wi/Wo) described above. The at least one nozzle (24) is typically integrally formed with/connected to the base (22). However, it is contemplated that the at least one nozzle (24) may be other than integrally formed with/connected to the base (22).

In various embodiments, the nozzle plate (20) includes two or more, or a plurality of, nozzles (24). For example, the nozzle plate (20) may have greater or equal to about 10, 20, 30, 40, 50, 60, 70, 80, 90, or 100, individual nozzles (24). The nozzles (24) may be arranged in any pattern. For example, the nozzles (24) may be arranged linearly, in a checkerboard pattern, etc. In various non-limiting embodiments, all values and ranges of values, both whole and fractional, including and between those set forth above are hereby expressly contemplated for use.

Figure 3B:
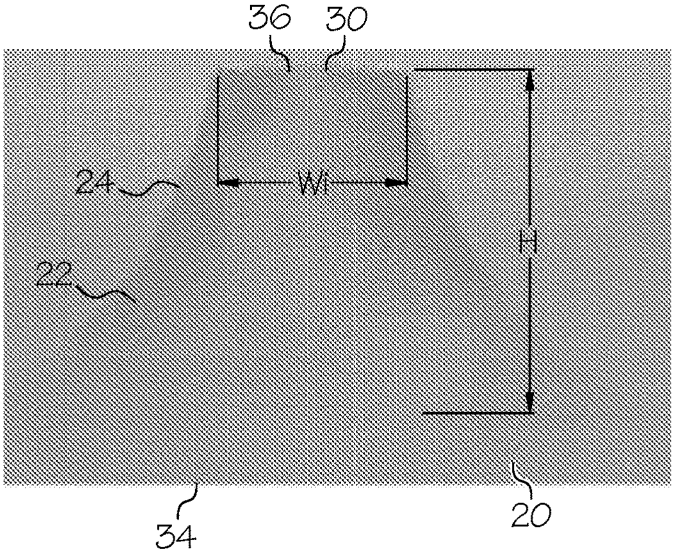
FIG. 3B is a side view of a nozzle of the instant disclosure that is approximately hyperboloid in shape.

As described above, each of the at least one nozzles (24) has a height (H) and an inner and outer width (Wi/Wo), e.g. as shown in FIG. 3B. Each of the at least one nozzles (24) may have the same or different heights (H) and inner and outer widths (Wi/Wo) as compared to one another. In various embodiments, the height (H) is from about 0.09 to about 1.6, about 0.1 to about 1.5, about 0.2 to about 1.4, about 0.3 to about 1.3, about 0.4 to about 1.2, about 0.4 to about 1.1, about 0.6 to about 1, about 0.7, to about 0.9, about 0.8 to about 0.9, about 0.1 to about 1, about 0.15 to about 0.95, about 0.2 to about 0.9, about 0.25 to about 0.85, about 0.3 to about 0.8, about 0.35 to about 0.75, about 0.4 to about 0.7, about 0.45 to about 0.65, about 0.5 to about 0.6, or about 0.55 to about 0.6, mm. In further embodiments, the inner width (Wi) is from about 0.03 to about 0.16, about 0.04 to about 0.15, 0.05 to about 0.14, about 0.06 to about 0.13, about 0.03 to 0.12, about 0.07 to about 0.12, about 0.08 to about 0.11, about 0.08 to about 0.10, mm, or about 0.03, 0.035, 0.04, 0.045, 0.05, 0.055, 0.06, 0.065, 0.07, 0.075, 0.08, 0.085, 0.09, 0.095, 0.1, 0.105, 0.11, 0.115, 0.12, 0.125, 0.13, 0.135, 0.14, 0.145, 0.15, 0.155, or 0.16, mm. In even further embodiments, the inner width (Wi) is from about 0.01 to about 0.5, about 0.05 to about 0.45, about 0.1 to about 0.4, about 0.15 to about 0.35, about 0.2 to about 0.3, or about 0.35 to about 0.3, mm. In other embodiments, the outer width (Wo) is about 5, 10, 15, 20, 25, 30, 35, 40, 45, 50, 55, 60, 65, 70, 75, 80, 85, 90, 95, 100 . . . up to about 1000, percent larger than the inner width (Wi), in mm. In various non-limiting embodiments, all values and ranges of values, both whole and fractional, including and between those set forth above are hereby expressly contemplated for use.

It is contemplated that the top (30) may have any shape, e.g. rectangular, about square, oval, about circular, etc. In various embodiments, the top (30) is approximately circular such that the inner width (Wi) is approximately defined as an inner diameter and the outer width (Wo) is approximately defined as an outer diameter. Therefore, the inner diameter and the outer diameter may be the same or different from the inner and outer widths (Wi/Wo) described above.

In other embodiments, the top (30) may be described as defining a nozzle orifice (36) through which a fluidic material can be jetted. In various embodiments, the nozzle orifice (36) has a nozzle diameter, e.g. inner width (Wi), of from about 0.000001 to about 0.001, alternatively from about 0.000005 to about 0.0005, or alternatively from about 0.00002 to about 0.00018, meters (m). The nozzle orifice (36) may have a nozzle diameter, e.g. inner width (Wi), of at least 0.000001, alternatively at least 0.000005, or alternatively at least 0.00002. The nozzle orifice (36) may alternatively have a nozzle diameter, e.g. inner width (Wi), of no greater than 0.001, alternatively no greater than 0.0005, or alternatively no greater than 0.00018, meters. In various non-limiting embodiments, all values and ranges of values, both whole and fractional, including and between those set forth above are hereby expressly contemplated for use.

In various embodiments, the ratio of the height (H) to the inner width (Wi) (or, for example, of the height (H) to the inner diameter) is greater than about 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.5, 11, 1.5, 12, 12.5, 13, 13.5, 14, 14.5, 15, 15.5, 16, 16.5, 17, 17.5, 18, 18.5, 19, 19.5, 20, or even more. In other embodiments, this ratio is from about 3 to about 10, about 4 to about 9, about 5 to about 7, about 5 to about 6, about 8 to about 10, about 8 to about 9, or about 9 to about 10. This may alternatively be described as a ratio of nozzle channel length to nozzle channel diameter. In various non-limiting embodiments, all values and ranges of values, both whole and fractional, including and between those set forth above are hereby expressly contemplated for use.

The shape of the at least one nozzle (24) is not particularly limited. In various embodiments, one or more of the at least one nozzles (24) may be approximately cylindrical, conical, hyperboloid or half hyperboloid or pyramidal, etc. The at least one nozzle (24) as shown in FIG. 3B can be described as approximately hyperboloid or half-hyperboloid, as understood by those of skill in the art.

Referring back to the nozzle plate (20) itself, the nozzle plate (20) may be, include, consist essentially of, or consist of a borosilicate glass. In various embodiments, the terminology "consists essentially of" describes that the nozzle plate (20) itself is free of, or includes less than 5, 4, 3, 2, 1, 0.5, 0.1, 0.05, or 0.01, weight percent of an organic compound or mineral that is not a borosilicate glass, e.g. free silicon that is not part of a borosilicate glass lattice or structure. For example, the nozzle plate (20) itself may be free of silicon that is not part of a borosilicate glass lattice or structure. It is also contemplated that the at least one nozzle (24) may be described in the same way as the nozzle plate (20) itself is described above. In various non-limiting embodiments, all values and ranges of values, both whole and fractional, including and between those set forth above are hereby expressly contemplated for use.

Borosilicate glass can be approximately arranged in the following groups, according to oxide composition (in mass fractions). Borosilicate glasses typically includes amounts of silica ($SiO_2$) and boric oxide ($B_2O_3$>8%) as glass network formers. The amount of boric oxide tends to influence glass properties in a particular way. The borosilicate glass may be a non-alkaline-earth borosilicate glass (borosilicate glass 3.3). In these embodiments, the $B_2O_3$ content for borosilicate glass is typically 12-13% and the $SiO_2$ content over 80%. The borosilicate glass may alternatively be an alkaline-earth-containing or aluminoborosilicate glass. In addition to about 75% $SiO_2$ and 8-12% $B_2O_3$, these glasses contain up to 5% alkaline earths and alumina ($Al_2O_3$). In other embodiments, the borosilicate glass may be described as a high-borate borosilicate glass that includes 15-25% $B_2O_3$, 65-70% $SiO_2$, and smaller amounts of alkali and $Al_2O_3$ as additional components. All combinations of the above are also contemplated for use in various embodiments. In various non-limiting embodiments, all values and ranges of values, both whole and fractional, including and between those set forth above are hereby expressly contemplated for use.

Coating Apparatus:

In other embodiments, this disclosure provides a coating apparatus for dispensing a fluidic material. The coating apparatus (not shown in the Figures) includes the aforementioned nozzle plate (20) and any other components required, as understood by those of skill in the art. For example, the coating apparatus may also include a positioning mechanism operationally attached to the nozzle plate (20) wherein the positioning mechanism is adapted to operate with a plurality of degrees of freedom, at least one fluid dispensing conduit operationally coupled to the nozzle plate (20) and to a supply of fluidic material wherein the fluidic material is dispensed via the nozzle plate (20); and a control mechanism operationally coupled to the positioning mechanism, wherein the control mechanism is adapted to control the positioning mechanism to position the nozzle plate (20) and wherein the control mechanism determines a flow of fluidic material to the nozzle plate (20).

In various embodiments, the nozzle plate (20) may be combined with a precision robotic controller to form an airless conformal coating apparatus. The precision robotic controller can be used to accurately position the nozzle plate (20) relative to a target. The precision robotic controller typically has a plurality of degrees of freedom, such as, for example, three or more degrees of freedom. The nozzle plate (20) and the precision robotic controller can be operationally connected to a supply of fluidic material which may be delivered directly to the nozzle plate (20) or, alternatively, to the nozzle plate (20) via the precision robotic controller.

This apparatus may include a fluidic material reservoir that is operationally coupled to an end effector to which the nozzle plate (20) may also be operationally and releasably attached. Alternatively, or in addition, the nozzle plate (20) may be attached to an apparatus, such as a multi-degree of freedom robotic positioning apparatus, that provides accurate positional displacement relative to an article or surface being coated. For example, when the nozzle plate (20) is moved in a horizontal direction relative to a target substrate (26), the nozzle plate (20) may coat a wide area thereby resulting in expeditious and efficient coating. In one embodiment, a fluidic material is typically supplied under pressure to the nozzle plate (20) and then forced through the at least one nozzle (24). At the same time, the nozzle plate (20) may travel (e.g. longitudinally) at a desired height (H) above a surface of a target. The fluidic material which issues from the at least one nozzle (24) can produce a jetting pattern on the surface. For example, the jetting pattern may have a clearly defined edge. Also, the amount of spattering, or extraneous material deposited outside the jetting pattern, can be minimized or eliminated. In an alternative embodiment, the nozzle plate (20) may be rotated about an axis relatively orthogonal to the surface of the target, resulting in circular coating patterns. In a further alternative embodiment, the nozzle plate (20) may be rotated about an axis relatively parallel to the surface of the target, for applications such as, coating an interior or exterior surface of a hollow vessel.

Figure 5:
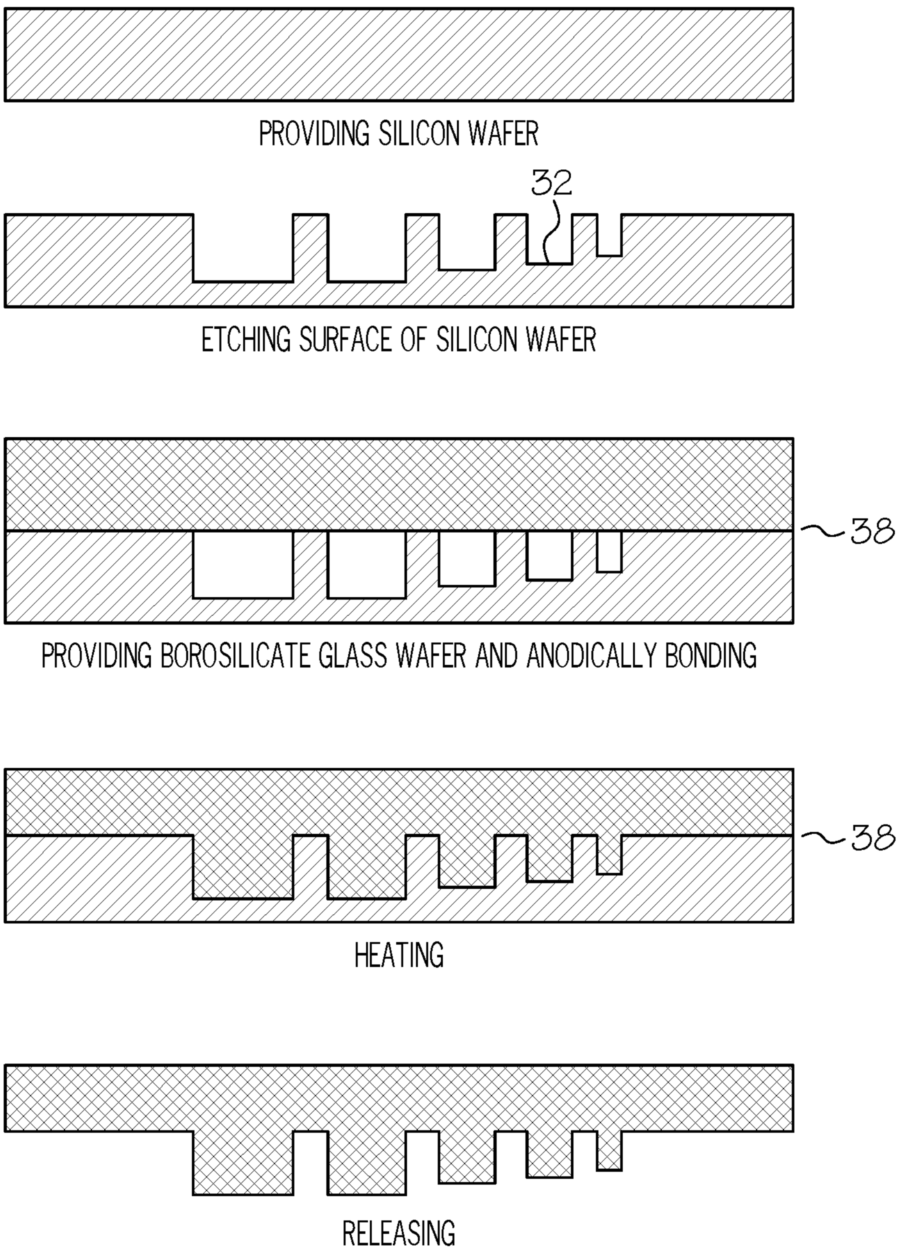
FIG. 5 is a schematic showing various steps of various embodiments of a method of this disclosure.

Method of Making a Nozzle Plate:

This disclosure also provides a method of making the nozzle plate (20). One non-limiting embodiment is set forth in FIG. 5. The method includes the steps of providing a silicon wafer having a surface; providing a borosilicate glass wafer having a surface; etching the surface of the silicon wafer to form a plurality of trenches (32) in the surface; anodically bonding the etched surface of the silicon wafer to the surface of the borosilicate glass wafer to form a two layer composite (38); heating the two layer composite (38) at a temperature of at least about 750° C. to soften the borosilicate glass wafer to a molten state such that molten borosilicate glass flows into the plurality of trenches (32) to form a plurality of nozzles (24); and releasing the silicon wafer from the borosilicate glass to form the nozzle plate (20) having the plurality of nozzles (24), wherein the nozzle plate (20) defines at least one nozzle (24) connected to the nozzle plate (20) at a base (22). None of these steps are particularly limited and each may be completed as understood by those of skill in the art.

Figure 6A:
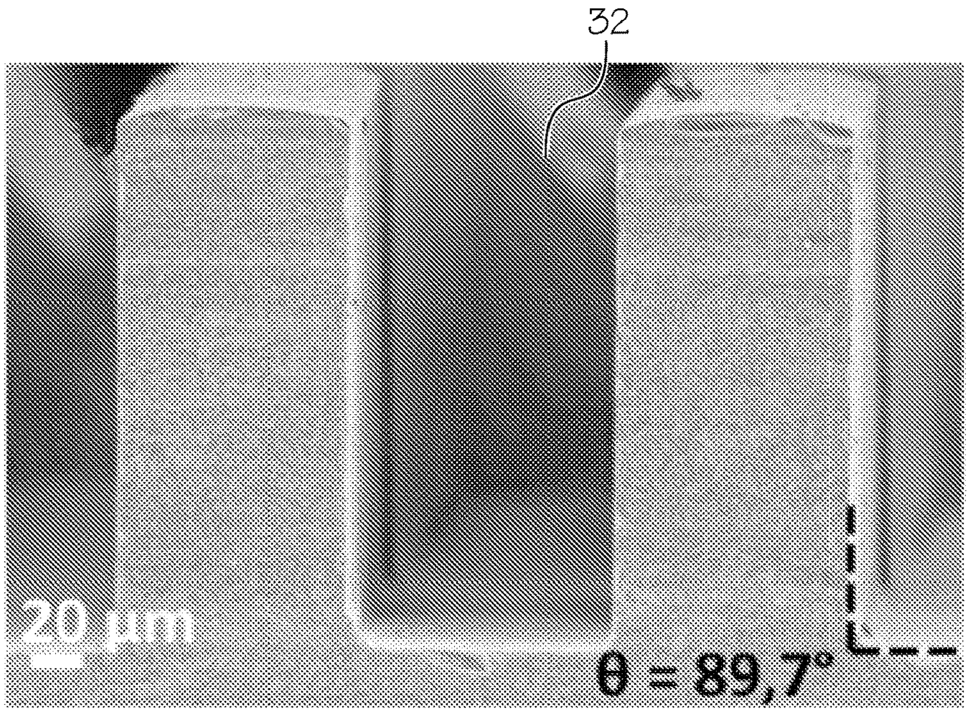
FIG. 6A is a scanning electron micrograph of various trenches that can be fabricated by a method of the instant disclosure.
Figure 6B:
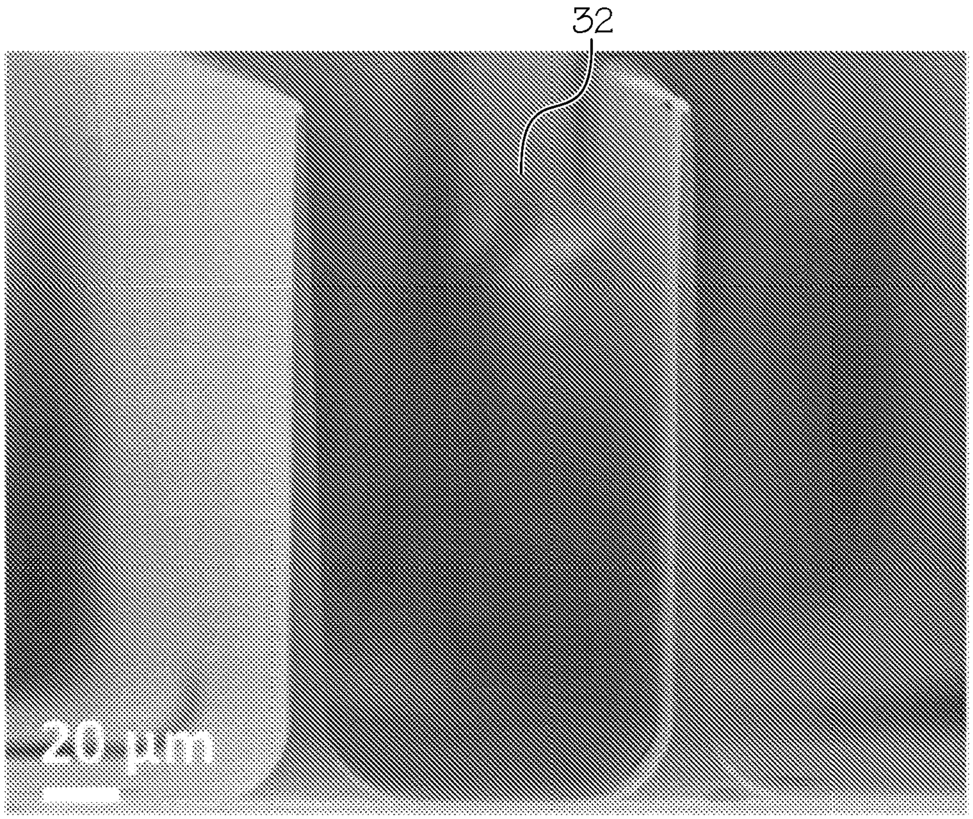
FIG. 6B is a scanning electron micrograph of additional trenches that can be fabricated by a method of the instant disclosure.

In various embodiments, the steps of providing the silicon wafer and/or borosilicate glass wafer may be described as delivering or making the wafers available for the method. Relative to the step of etching, this step may utilize any etching known in the art that can produce the aforementioned plurality of trenches (32) in the surface, e.g. as shown in FIGS. 6A and 6B. In various embodiments, the step of etching is conducting using deep reactive ion etching (DRIE), e.g. as based on the Bosch process as described in K.-S. Chen, A. A. Ayon, X. Zhang, and S. M. Spearing, "Effect of process parameters on the surface morphology and mechanical performance of silicon structures after deep reactive ion etching (DRIE)," J. Microelectromech. Syst., vol. 11, no. 3, pp. 264-275, June 2002.

In various embodiments, an about 100 mm diameter, p type, <100> orientation, 1-10 Ω-cm resistivity, 500 μm thick silicon wafer (mold) and a borosilicate glass wafer that is about 500 μm thick are utilized. Trenches with the approximately the same or different widths can then be fabricated by photolithography and/or DRIE in the silicon wafer. For example, the DRIE can be performed using a photoresist mask. The trench can be etched to a depth of greater or equal to the height (H) of the at least one nozzle (24) using, for example, Advanced Silicon Etch STS ICP. The etching conditions are not particularly limited and can be about: 130 sccm of SF6 and 13 sccm of $O_2$, 600 W RF coil power, 18 W RF platen power for a 13 sec etching cycle and 85 sccm of C4F8, 600 W RF coil power and 0 W RF platen power for 7 sec passivation cycle (0 s overlap with etching cycle). The automatic pressure control valve (APC) can be fixed at about 82% leading to a pressure of about 30 mTorr and about 16 mTorr for etching and passivation cycles, respectively. In some embodiments, it is possible to achieve an etch rate of up to 4.3 μm/min for large trenches (32). Due to the aspect-ratio dependent etching effect (ARDE), the etch depth can be smaller for narrow trenches (32) compared to wider ones. In various non-limiting embodiments, all values and ranges of values, both whole and fractional, including and between those set forth above are hereby expressly contemplated for use.

The method also includes the step of anodically bonding the etched surface of the silicon wafer to the surface of the borosilicate glass wafer to form a two layer composite (38). Any type of method of anodic bonding may be utilized herein. Before bonding, the etched Si wafer and the borosilicate glass wafer can be cleaned, e.g. using a Piranha solution (about 1:2 mixture of $H_2O_2$:$H_2SO_4$) for about 15 min, followed by SC1 solution (1:1:5 mixture of $NH_4OH$:$H_2O_2$:$H_2O$) at about 75° C. for about 15 min. The etched Si wafer can also be immersed in a hydrofluoric acid solution (about 1:50 mixture of HF:$H_2O$) for about 30 s to remove native oxide. Both wafers can then be rinsed with deionized water and dried by nitrogen gas. The two wafers can then be anodically bonded in a wafer bonder (AML) to create low-pressure hermitic micro-cavities. The bonding can be carried out using any procedure known in the art. For example, the bonding can be carried out under vacuum (about 150 μTorr, air). The wafers can be heated simultaneously to about 370° C. to increase the mobility of positive ions in the borosilicate glass wafer before bringing them in contact with one another. Once a desired temperature is reached and the pressure is stabilized, the wafers can be put in contact and a mechanical force of about 200 N can be applied uniformly over the surface of the wafers. A voltage of about 500 V can then be applied with a current limit fixed to about 4 mA. The bond is completed when the current decays to a residual value of about 0.1 mA. An elapsed time can be about 20 minutes. Subsequent cooling can be done with a rate of 3° C./min, down to about room temperature. Bonding strength can be examined by any crack-opening characterization method known in the art. For example, when a wedge of a thickness of 0.3 mm is inserted into the bond interface, the silicon side can crack. This suggests that the bonding energy is greater than the fracture surface energy of the silicon. In various non-limiting embodiments, all values and ranges of values, both whole and fractional, including and between those set forth above are hereby expressly contemplated for use.

Figure 6C:
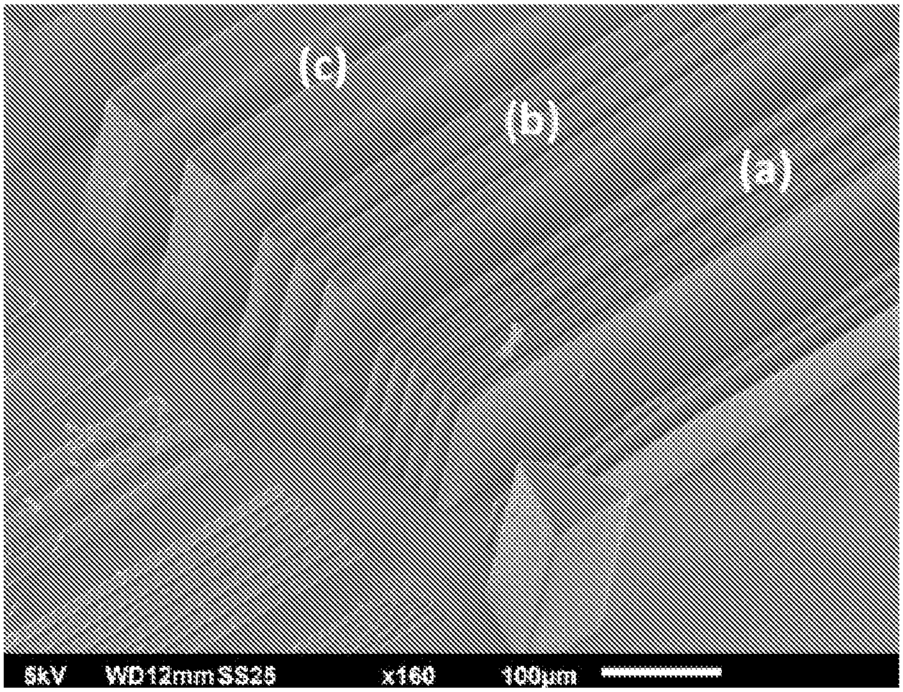
FIG. 6C is a scanning electron micrograph of glass structures that can be fabricated by a method of the instant disclosure.

The method also includes the step of heating the two layer composite (38) at a temperature of at least about 750° C. to soften the borosilicate glass wafer to a molten state such that molten borosilicate glass flows into the plurality of trenches (32) to form a plurality of shapes, e.g. as shown in FIG. 6C, wherein the shapes can be nozzles (24). For example, after bonding, the bonded wafers can be heated in a furnace lowering the glass viscosity. Therefore, the softened glass flows into the trenches (32) due to a pressure difference between the trenches (32) and the furnace ambient. Nitrogen or argon gases can be used as an environment gas. If a top (30) glass surface deforms, lapping and polishing of the surface can be done to planarize and smooth the glass surface. Various shape of structures that can be formed using such trenches (32) are set forth in FIGS. 6A-C. In various embodiments, the temperature is at least about 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or 2000, ° C., or any temperature or range therebetween. Moreover, the step of heating may be conducted using any method known in the art. In various non-limiting embodiments, all values and ranges of values, both whole and fractional, including and between those set forth above are hereby expressly contemplated for use.

The method also includes the step of releasing the silicon wafer from the borosilicate glass to form the nozzle plate (20) having the plurality of nozzles (24), wherein the nozzle plate (20) defines at least one nozzle (24) connected to the nozzle plate (20) at a base (22). The step of releasing may be achieved using any method known in the art. For example, in one embodiment, KOH wet etching is used. In one example, the wafers are etched in a KOH solution (45% by weight) heated at a temperature of about 95±5° C. The etch rate of the silicon and the molded glass under these etching conditions can be about 2 μm/min and about 50 nm/min respectively, for a selectivity of about 40:1. In various non-limiting embodiments, all values and ranges of values, both whole and fractional, including and between those set forth above are hereby expressly contemplated for use.

Alternatively, $XeF_2$ can be used. In one example, oxygen plasma can be applied (e.g. about 60 s, about 100 mTorr and about 400 Watt) to remove organic contamination followed by $CF_4/O_2$ RIE plasma (about 5 s, about 200 mTorr and about 400 W) to remove native oxide. The sample can then be introduced into a pulsed $XeF_2$ etching system E1 of SPTS (150 mm platen, quartz showerhead) for silicon removal. As just one example, $XeF_2$ etching can be performed for about 300 or more cycles to remove the silicon. The cycle can include a $XeF_2$ pulse of about 10 s at about 3 Torr and an overhead (pump time between pulses) of about 18 s. In various non-limiting embodiments, all values and ranges of values, both whole and fractional, including and between those set forth above are hereby expressly contemplated for use.

Method of Jetting Fluidic Material Through the Nozzle Plate (20):

This disclosure also provides a method of jetting a fluidic material through the nozzle plate (20) and onto a substrate (26). The method includes the steps of providing the aforementioned nozzle plate (20) and jetting the fluidic material through the at least one nozzle (24) to form a jet of the fluidic material (28) that contacts the substrate (26) disposed at a distance (D) from the nozzle; wherein the jet (28) has a breakup length that is greater than the distance (D) such that the jet (28) does not break apart into individual droplets before contacting the substrate (26). For example, the step of jetting can include applying an electrostatic charge to the fluidic material.

Figure 8:
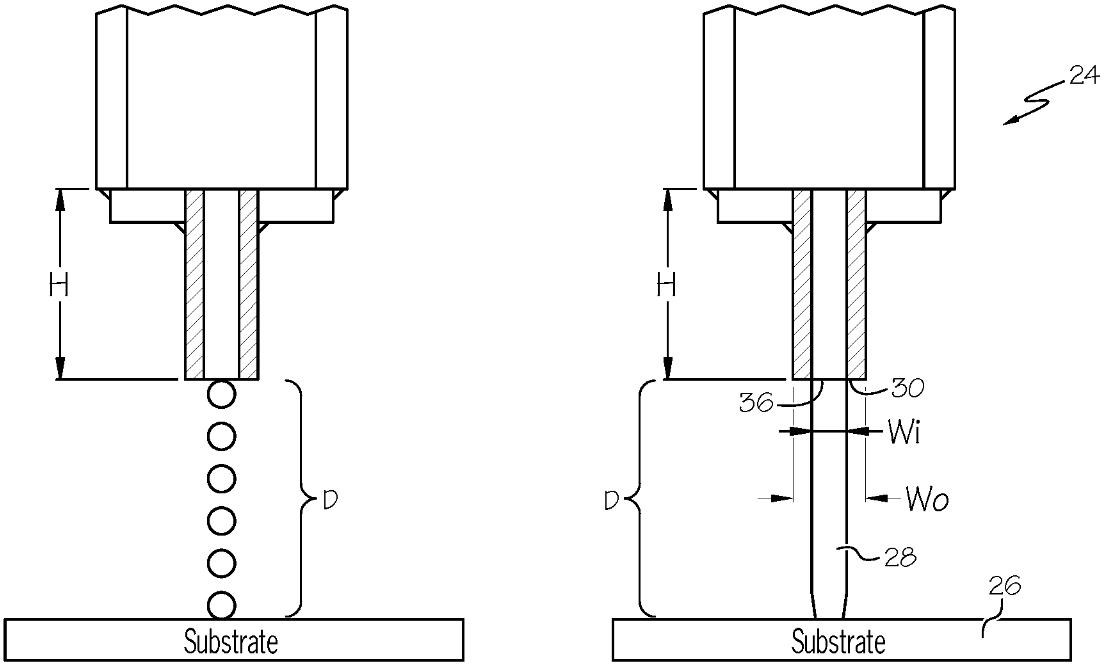
FIG. 8 is a side cross-sectional view of a comparative nozzle (left) that disposes a fluidic material drop-wise over distance (D) and an embodiment of a nozzle of this disclosure (right) that jets the fluidic material, wherein the jet has a breakup length that is greater than the distance (D) such that the jet does not break apart into individual droplets before contacting the substrate, in contrast to the comparative nozzle.

A schematic representation of the distance (D) and the breakup length is set forth in FIG. 8. In various embodiments, the distance is about 1 to about 100, about 5 to about 50, about 10 to about 30, about 5 to about 95, about 10 to about 90, about 15 to about 85, about 20 to about 80, about 25 to about 75, about 30 to about 70, about 35 to about 65, about 40 to about 60, about 45 to about 55, or about 50 to about 55, mm. In various non-limiting embodiments, all values and ranges of values, both whole and fractional, including and between those set forth above are hereby expressly contemplated for use.

The nozzle plate (20) may apply the fluidic material via valve jet, piezo-electric, thermal, acoustic, or ultrasonic membrane. In one embodiment, the nozzle plate (20) is a piezoelectric applicator that includes a piezoelectric element configured to deform between a draw position, a rest position, and an application position. The nozzle plate (20) may be described as having a jetting frequency of from about 100 to about 1,000,000 Hz, alternatively from about 10,000 Hz to about 100,000 Hz, or alternatively from about 30,000 Hz to about 60,000 Hz. The nozzle plate (20) may be configured to expel the fluidic material through the at least one nozzle (24) at an impact velocity of from about 0.2 m/s to about 20 m/s. Alternatively, the nozzle plate (20) may be configured to expel the fluidic material through the at least one nozzle (24) at an impact velocity of from about 0.4 m/s to about 10 m/s.

In various embodiments, at least about 80, 85, 90, 95, 96, 97, 98, 99, 99.9, or even up to about 99.99, 99.999, or 99.9999, or about 100, % of the fluidic material expelled or jetted through the at least one nozzle (24) contacts the substrate (26). This reduces an amount of the fluidic material entering the environment, improves efficiency of application of the fluidic material, reduces waste generation, and reduces maintenance. In various non-limiting embodiments, all values and ranges of values, both whole and fractional, including and between those set forth above are hereby expressly contemplated for use.

The nozzle plate (20) and the at least one nozzle (24) can be configured to form any type of line, pattern, or shape. For example, the pattern may be regular or irregular, camouflage, single toned, two-toned, or more, striped, etc.

Two or more nozzle plates (20) may be coupled together to form a print head assembly. In certain embodiments, the nozzle plates (20) are aligned together such that the y-axis of each of the nozzle plates (20) is parallel to the other y-axes. Further, the at least one nozzle (24) of each of the nozzle plates (20) may be aligned with each other along an x-axis, which is perpendicular to the y-axis, such that an "array" is formed. One nozzle may be equally spaced from the other nozzles (24) directly adjacent the one nozzle, relative to the x-axis and the y-axis. This configuration of nozzles (24) may be suitable for applying the same fluidic material by each of the nozzle plates (20) as the print head assembly moves along the x-axis. Without being bound by theory, it is believed that equal spacing of the nozzles (24), relative to both the x-axis and the y-axis, may result in uniform application of the same fluidic material which may be suitable for single-color applications, two-tone color applications, and the like. Alternatively, one set of nozzles (24) along a first y-axis may be closely spaced to another set of nozzles (24) relative to the spacing of each of the nozzles (24) along the y-axis of a single nozzle plate (20). This configuration of nozzles (24) may be suitable for applying different fluidic materials. Different fluidic materials may be suitable for logos, designs, signage, striped, camouflage appearance, and the like.

The at least one nozzle (24) of the nozzle plate (20) may have any configuration known in the art, such as linear, concave relative to a substrate (26), convex relative to a substrate (26), circular, and the like. Adjustment of the configuration of the at least one nozzle (24) may be necessary to facilitate cooperation of the nozzle plate (20) to substrates (26) having irregular configurations, such as vehicles including mirrors, trim panels, contours, spoilers, and the like.

Referring now to the fluidic material itself, it is not particularly limited. In one embodiment, the fluidic material is a resin having a viscosity of about 5 to 700 cps. In an alternative embodiment, the fluidic material is a resin applied with an extrusive pressure in the range of 5-500 kg/cm. The fluidic material may be a paint, coating, ink, or fluid. In one embodiment, the fluidic material forms a coating layer on the substrate (26). The coating layer may be utilized as a basecoat, a clearcoat, a color coat, a top coat, a single-stage coat, a mid coat, a primer, a sealer, or combinations thereof. In certain embodiments, the fluidic material is utilized to form a basecoat coating layer. In various non-limiting embodiments, all values and ranges of values, both whole and fractional, including and between those set forth above are hereby expressly contemplated for use.

The term "basecoat" refers to a coating that is opaque and provides most of protection, color, hiding (also known as "opacity") and visual appearance. A basecoat typically contains color pigments, effect pigments such as metallic flakes pigments, rheology control agent, UV absorber and other coating additives. The term "basecoat fluidic material" refers to a fluidic material that can be used to form a basecoat. The term "basecoat layer" refers to a coating layer form from a basecoat fluidic material. A basecoat layer can be formed by applying one or more layers of the same or different basecoat fluidic materials. In automotive coatings, a substrate (26) is typically coated with a primer layer for protection and adhesion, then a basecoat layer over the primer layer, optionally a sealer on top of primer, for most of protection, color and most of visual appearance, and subsequently a clearcoat layer over the basecoat layer for further protection and visual appearance. Sometimes, a single coating layer, referred to as "top coat" can be used to provide the function of both the basecoat and the clearcoat. Additional coating layer can also be used. For example, a metal substrate (26) can be treated with a phosphate material and coated with an electrocoat layer before applying the primer layer.

The term "mid coat" or "mid coat layer" refers to a colored non-opaque coating positioned between a basecoat layer and a clearcoat layer in a multi-layer coating system. To achieve some unique and attractive colors or visual effects, the automobile industry and other coating end use applications can use multi-layer coatings having three or more coating layers instead of the traditional "basecoat and clearcoat" two-layer coating system. The multi-layer system can usually comprise at least a first colored and opaque basecoat layer, a second non-opaque color coat deposited over at least a portion of the basecoat layer, and a third clearcoat layer deposited over at least a portion of the second non-opaque color coating layer. The second non-opaque color coat is typically referred to as a mid coat layer, which contains colored pigments. The mid coat is typically formulated to be non-opaque so the color of the basecoat underneath can be visible through the mid coat.

In various embodiments, the fluidic material includes various components, such as binders, pigments, extender pigments, dyes, rheology modifiers, carriers, such as organic solvents, water, and non-aqueous solvents, catalysts, conventional additives, or combinations thereof. In embodiments the carrier is selected from the group of water, a non-aqueous solvent, and a combination thereof. Conventional additives may include, but are not limited to, dispersants, antioxidants, UV stabilizers and absorbers, surfactants, wetting agents, leveling agents, antifoaming agents, anti-cratering agents, or combinations thereof.

The term "binder" refers to film forming constituents of the fluidic material. Typically, a binder can include polymers, oligomers, or a combination thereof that are essential for forming a coating having desired properties, such as hardness, protection, adhesion, and others. Additional components, such as carriers, pigments, catalysts, rheology modifiers, antioxidants, UV stabilizers and absorbers, leveling agents, antifoaming agents, anti-cratering agents, or other conventional additives may not be included in the term "binder" unless any of these additional components are film forming constituents of the fluidic material. One or more of those additional components can be included in the fluidic material. In certain embodiments, the binder includes polymers.

In embodiments, the polymer has a crosslinkable-functional group, such as an isocyanate-reactive group. The term "crosslinkable-functional group" refers to functional groups that are positioned in the oligomer, in the polymer, in the backbone of the polymer, in the pendant from the backbone of the polymer, terminally positioned on the backbone of the polymer, or combinations thereof, wherein these functional groups are capable of crosslinking with crosslinking-functional groups (during the curing step) to produce a coating in the form of crosslinked structures. Typical crosslinkable-functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable-functional groups.

The fluidic material may include a polyester-polyurethane polymer, a latex polymer, a melamine resin, or combinations thereof. It is to be appreciated that other polymers may be included in the fluidic material.

The polyester of the polyester-polyurethane polymer may be linear or branched. Useful polyesters can include esterification products of aliphatic or aromatic dicarboxylic acids, polyols, diols, aromatic or aliphatic cyclic anhydrides and cyclic alcohols. Non-limiting examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic, and cyclobutanetetracarboxylic acid. The cycloaliphatic polycarboxylic acids can be used not only in their cis but also in their trans form and as a mixture of both forms. Further non-limiting examples of suitable polycarboxylic acids can include aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid. Combinations of polyacids, such as a combination of polycarboxylic acids and cycloaliphatic polycarboxylic acids can be suitable. Combinations of polyols can also be suitable.

Non-limiting suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. If desired, monohydric alcohols, such as, for example, butanol, octanol, lauryl alcohol, ethoxylated or propoxylated phenols may also be included along with polyhydric alcohols to control the molecular weight.

Non-limiting examples of suitable polyesters include a branched copolyester polymer. The branched copolyester polymer and process for production described in U.S. Pat. No. 6,861,495, which is hereby incorporated by reference, can be suitable. Monomers with multifunctional groups such as AxBy (x,y=1 to 3, independently) types including those having one carboxyl group and two hydroxyl groups, two carboxyl groups and one hydroxyl group, one carboxyl group and three hydroxyl groups, or three carboxyl groups and one hydroxyl group can be used to create branched structures. Non-limiting examples of such monomers include 2,3 dihydroxy propionic acid, 2,3 dihydroxy 2-methyl propionic acid, 2,2 dihydroxy propionic acid, 2,2-bis(hydroxymethyl) propionic acid, and the like.

The branched copolyester polymer can be conventionally polymerized from a monomer mixture containing a chain extender selected from the group of a hydroxy carboxylic acid, a lactone of a hydroxy carboxylic acid, and a combination thereof; and one or more branching monomers. Some of the suitable hydroxy carboxylic acids include glycolic acid, lactic acid, 3-hydroxypropionic acid, 3-hydroxybutyric acid, 3-hydroxyvaleric acid, and hydroxypyvalic acid. Some of the suitable lactones include caprolactone, valerolactone; and lactones of the corresponding hydroxy carboxylic acids, such as, e.g., 3-hydroxypropionic acid, 3-hydroxybutyric acid, 3-hydroxyvaleric acid, and hydroxypyvalic acid. In certain embodiments, caprolactone can is utilized. In embodiments, the branched copolyester polymer can be produced by polymerizing, in one step, the monomer mixture that includes the chain extender and hyper branching monomers, or by first polymerizing the hyper branching monomers followed by polymerizing the chain extenders. It is to be appreciated that the branched copolyester polymer can be formed from acrylic core with extending monomers described above.

The polyester-polyurethane polymer can be produced from the polyester and polyisocyanates. The polyester can be polymeric or oligomeric organic species with at least two hydroxyl-functionalities or two-mercapto functionalities and their mixtures thereof. Polyesters and polycarbonates with terminal hydroxy groups can be effectively used as the diols.

The polyurethane polymers may be produced by reacting polyisocyanate(s) with polyol(s) in the excess. In certain embodiments, low molar mass polyols defined by an empirical and structural formula, such as polyhydric alcohols are utilized to form the polyurethane polymer. Non-limiting examples of polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. In other embodiments, oligomeric or polymeric polyols with number-average molar masses of, for example, up to 8000, alternatively up to 5000, alternative up to 2000, and/or, for example, corresponding hydroxyl-functional polyethers, polyesters or polycarbonates are utilized to form the polyurethane polymer.

Non-limiting examples of suitable polyisocyanates include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of two molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate. Other polyisocyanates disclosed herein can also be suitable for producing polyurethanes.

Aqueous polyurethane binders and their production are well known to the skilled person. Typical and useful non-limiting examples of aqueous polyurethane binders comprise aqueous polyurethane binder dispersions which can typically be made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender like, for example, a polyamine, a hydrazine derivative or water. Such aqueous polyurethane binder dispersions as have been used as binders in waterborne base (22) coat compositions as are conventional in the production of base (22) coat/clear coat two-layer coatings of car bodies and body parts can be used in fluidic material A; non-limiting examples of aqueous polyurethane binder dispersions which can be used in fluidic material A can be found in U.S. Pat. Nos. 4,851,460, 5,342,882 and US 2010/0048811 A1, which are expressly incorporated herein by reference.

One non-limiting example of a polyester-polyurethane polymer is a polyurethane dispersion resin formed from a linear polyester diol resin (reaction product of monomers 1,6-hexanediol, adipic acid, and isophthalic acid) and isophorone diisocyanate. This polyester-polyurethane polymer has a weight average molecular weight of about 30,000, a solids content of about 35 wt. %, and a particle size of about 250 nanometers.

Another non-limiting example of a polyester-polyurethane polymer is a polyurethane dispersion resin formed from a linear polycarbonate-polyester and isophorone diisocyanate. This polyester-polyurethane polymer has a weight average molecular weight of about 75,000, a solids content of about 35 wt. %, and a particle size of about 180 nanometers.

In certain embodiments, the fluidic material including the polyester-polyurethane polymer may exhibit an increase in the elasticity of the fluidic material as compared to a fluidic material free of the polyester-polyurethane polymer. An increase in elasticity of the fluidic material may improve suitability of the fluidic material for application by increasing relaxation time of the fluidic material. In various embodiments, the polyester-polyurethane polymer having the weight average molecular weight of 75,000, when included in the fluidic material, increases the relaxation time of the fluidic material as compared to a fluidic material including the polyester-polyurethane polymer having the weight average molecular weight of 30,000. It is to be appreciated that the relationship of increasing weight average molecular weight to increasing relaxation time of the fluidic material may not be limited to polyester-polyurethane polymers. For example, polymers having weight average molecular weights of at least 300,000, when incorporated into the fluidic material, may result in the fluidic material exhibiting an increased relaxation time relative to a fluidic material including the polymer with a weight average molecular weights of less than 300,000. It is further to be appreciated that incorporation of at least minor concentrations of high molecular weight polymers (e.g., at least 300,000) in the fluidic material may be used to improve suitability of the fluidic material by at least minimizing the formation of satellite droplet.

The fluidic material may include the polyester-polyurethane polymer in an amount of from about 0.1 to about 50, alternatively from about 1 to about 20, or alternatively from about 1 to about 10, wt. %, based on a total weight of the fluidic material. In exemplary embodiments, the fluidic material includes a polyester-polyurethane polymer having the tradename Bayhydrol® U 241 which is commercially available from Covestro AG of Leverkusen, Germany.

The latex polymers, such as aqueous (meth)acryl copolymer latex binders and their production, are well known to the skilled person. Aqueous (meth)acryl copolymer latex binders can typically be made by free-radical emulsion copolymerization of olefinically unsaturated free-radically copolymerizable comonomers. For example, WO2006/118974 A1, WO2008/124136 A1, WO2008/124137 A1 and WO2008/124141 A1, which are expressly incorporated herein by reference, disclose aqueous (meth)acryl copolymer latex binders and their use as binders in waterborne base (22) coat compositions as are conventional in the production of base (22) coat/clear coat two-layer coatings of car bodies and body parts. The aqueous (meth)acryl copolymer latex binders disclosed in WO2006/118974 A1, WO2008/124136 A1, WO2008/124137 A1 and WO2008/124141 A1, which are expressly incorporated herein by reference, are non-limiting examples of aqueous (meth)acryl copolymer latex binders which can be used in the fluidic material.

Melamine resins may be partially or fully etherified with one or more alcohols like methanol or butanol. A non-limiting example is hexamethoxymethyl melamine. Non-limiting examples of suitable melamine resins include monomeric melamine, polymeric melamine-formaldehyde resin, or a combination thereof. The monomeric melamines include low molecular weight melamines which contain, on an average, three or more methylol groups etherized with a C1 to C5 monohydric alcohol such as methanol, n-butanol, or isobutanol per triazine nucleus, and have an average degree of condensation up to about 2 and, in certain embodiments, in the range of from about 1.1 to about 1.8, and have a proportion of mononuclear species not less than about 50 percent by weight. By contrast the polymeric melamines have an average degree of condensation of more than about 1.9. Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327, 370 and XW3106, which are all monomeric melamines. Suitable polymeric melamines include high amino (partially alkylated, —N, —H) melamine known as Resimene® BMP5503 (molecular weight 690, polydispersity of 1.98, 56% butyl, 44% amino), which is supplied by Solutia Inc., St. Louis, Mo., or Cymel®1158 provided by Cytec Industries Inc., West Patterson, N.J. Cytec Industries Inc. also supplies Cymel® 1130@80 percent solids (degree of polymerization of 2.5), Cymel® 1133 (48% methyl, 4% methylol and 48% butyl), both of which are polymeric melamines.

The fluidic material may include the melamine resin in an amount of from about 0.1 to about 50, alternatively from about 1 to about 20, or alternatively from about 1 to about 10, wt. %, based on a total weight of the fluidic material. In exemplary embodiments, the fluidic material includes a melamine-formaldehyde resin having the tradename Cymel® 303 which is commercially available from Cytec Industries Inc. of West Patterson, N.J.

The binder of the fluidic material may further include a crosslinking agent that can react with the crosslinkable-functional groups of the polymers of the binder, to form a crosslinked polymeric network, herein referred to as a crosslinked network. It is to be appreciated that the crosslinking agent is not necessary in all fluidic materials, but may be utilized in the fluidic material to improve inter-coat adhesion, such as between the basecoat and the clearcoat, and for curing, such as within the clearcoat.

The term "crosslinking agent" refers to a component having "crosslinking-functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable-functional groups (during the curing step) to produce a coating in the form of crosslinked structures. One of ordinary skill in the art would recognize that certain combinations of crosslinking-functional group and crosslinkable-functional groups would be excluded, since they would fail to crosslink and produce the film forming crosslinked structures. The fluidic material may include more than one type of crosslinking agent that have the same or different crosslinking-functional groups. Typical crosslinking-functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide, or combinations thereof.

Polyisocyanates having isocyanate-functional groups may be utilized as the crosslinking agent to react with the crosslinkable-functional groups, such as hydroxyl-functional groups and amine-functional groups. In certain embodiments, only primary and secondary amine-functional groups may be reacted with the isocyanate-functional groups. Suitable polyisocyanate can have on average 2 to 10, alternately 2.5 to 8, or alternately 3 to 8, isocyanate functionalities. Typically, the fluidic material has a ratio of isocyanate-functional groups on the polyisocyanate to crosslinkable-functional group (e.g., hydroxyl and/or amine groups), of from about 0.25:1 to about 3:1, alternatively from about 0.8:1 to about 2:1, or alternatively from about 1:1 to about 1.8:1. In other embodiments, melamine compounds having melamine-functional groups may be utilized as the crosslinking agent to react with the crosslinkable-functional groups.

Non-limiting examples of suitable polyisocyanates include any of the conventionally used aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate; uretidiones of hexamethylene diisocyanate; uretidiones of isophorone diisocyanate or isophorone diisocyanate; isocyanurate of meta-tetramethylxylylene diisocyanate; and a diol such as, ethylene glycol.

Polyisocyanate-functional adducts having isocyanaurate structural units can also be used, for example, the adduct of 2 molecules of a diisocyanate, such as, hexamethylene diisocyanate or isophorone diisocyanate, and a diol such as ethylene glycol; the adduct of 3 molecules of hexamethylene diisocyanate and 1 molecule of water (commercially available from Bayer Corporation of Pittsburgh, Pennsylvania under the trade name Desmodur® N); the adduct of 1 molecule of trimethylol propane and 3 molecules of toluene diisocyanate (commercially available from Bayer Corporation of Pittsburgh, Pennsylvania under the trade name Desmodur® L); the adduct of 1 molecule of trimethylol propane and 3 molecules of isophorone diisocyanate or compounds, such as 1,3,5-triisocyanato benzene and 2,4,6-triisocyanatotoluene; and the adduct of 1 molecule of pentaerythritol and 4 molecules of toluene diisocyanate.

The fluidic material may include monomeric, oligomeric, or polymeric compounds that are curable by ultraviolet (UV), electron beam (EB), laser, and the like. Placement of a UV, EB, or laser source on the nozzle plate (20) may result in direct photo initiation of each droplet that is applied to the substrate (26) by the nozzle plate (20). The increase in use of monomers relative to polymers can increase the curable solids of the fluidic material without increasing the viscosity of the fluidic material thereby reducing the volatile organic carbons (VOCs) released into the environment. However, the increase in use of monomers relative to polymers may impact one or more properties of the fluidic material. Adjustment of the properties of the fluidic material may be necessary to render the fluidic material suitable for application utilizing the nozzle plate (20) including, but not limited to, viscosity ($\eta_0$), density ($\rho$), surface tension ($\sigma$), and relaxation time ($\lambda$). Further, adjustment of properties of the nozzle plate (20) may be necessary to render the nozzle plate (20) suitable for application, including, but not limited to, nozzle diameter (D) of the nozzle plate (20), impact velocity (v) of the fluidic material by the nozzle plate (20), speed of the nozzle plate (20), distance of the nozzle plate (20) from the substrate (26), droplet size of the fluidic material by the nozzle plate (20), firing rate of the nozzle plate (20), and orientation of the nozzle plate (20) relative to the force of gravity.

The fluidic material may include monomeric, oligomeric, or polymeric compounds having a number average molecular weight of from about 400 to about 20,000 and having a free-radically polymerizable double bond. The fluidic material can also include a photo initiator.

The fluidic material may include the monomeric, oligomeric, or polymeric compounds in an amount of from about 20 wt. % to about 90 wt. % based on a total weight of the fluidic material. The fluidic material may include the photo initiator in an amount of from about 0.1 wt. % to about 2 wt. % based on a total weight of the fluidic material. It is to be appreciated that the fluidic material including the monomeric, oligomeric, or polymeric compounds may have up to 100% solids content based on a total weight of the fluidic material.

In various embodiments, the fluidic material is waterborne and includes about 40 wt % to about 90 wt % water, alternatively about 40 wt % to about 70 wt % water, based on the total weight of the composition. The fluidic material can include any UV curable water-dispersible or latex polymer. A "latex" polymer means a dispersion of polymer particles in water; a latex polymer typically requires a secondary dispersing agent (e.g., a surfactant) for creating a dispersion or emulsion of polymer particles in water. A "water-dispersible" polymer means the polymer is itself capable of being dispersed into water (i.e., without requiring the use of a separate surfactant) or water can be added to the polymer to form a stable aqueous dispersion (i.e., the dispersion should have at least one month shelf stability at normal storage temperatures). Such water-dispersible polymers can include nonionic or anionic functionality on the polymer, which assist in rendering them water-dispersible. For such polymers, external acids or bases are typically required for anionic stabilization.

Suitable UV curable polymers include, but are not limited to, polyurethanes, epoxies, polyamides, chlorinated polyolefins, acrylics, oil-modified polymers, polyesters, and mixtures or copolymers thereof. The UV curable polymers in the fluidic material can include a wide variety of functional groups to modify their properties for a particular application, including, for example, acetoacetyl, (meth)acryl (wherein "(meth)acryl" refers to any of methacryl, methacrylate, acryl or acrylate), vinyl, vinyl ether, (meth)allyl ether (wherein (meth)allyl ether refers to an allyl ether and a methallyl ether), or mixtures thereof.

Acetoacetyl functionality may be incorporated into the UV curable polymer through the use of: acetoacetoxyethyl acrylate, acetoacetoxypropyl methacrylate, allyl acetoacetate, acetoacetoxybutyl methacrylate, 2,3-di(acetoacetoxy) propyl methacrylate, 2-(acetoacetoxy)ethyl methacrylate, t-butyl acetoacetate, diketene, and the like, or combinations thereof. In general, any polymerizable hydroxy functional or other active hydrogen containing monomer can be converted to the corresponding acetoacetyl functional monomer by reaction with diketene or other suitable acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol. 62, 1990, 101 (and references contained therein)). In fluidic materials, the acetoacetyl functional group is incorporated into the polymer via 2-(acetoacetoxy)ethyl methacrylate, t-butyl acetoacetate, diketene, or combinations thereof.

Fluidic materials may incorporate a free radically polymerizable component that includes at least one ingredient including free radically polymerizable functionality. Representative examples of free radically polymerizable functionality that is suitable include (meth)acrylate groups, olefinic carbon-carbon double bonds, allyloxy groups, alpha-methyl styrene groups, (meth)acrylamide groups, cyanate ester groups, (meth)acrylonitrile groups, vinyl ethers groups, combinations of these, and the like. The term "(meth)acryl", as used herein, encompasses acryl and/or methacryl unless otherwise expressly stated. Acryl moieties are may be utilized relative to methacryl moieties in many instances, as acryl moieties tend to cure faster.

Prior to initiating curing, free radically polymerizable groups may provide compositions with relatively long shelf life that resist premature polymerization reactions in storage. At the time of use, polymerization can be initiated on demand with good control by using one or more suitable curing techniques. Illustrative curing techniques include but are not limited to exposure to thermal energy; exposure to one or more types of electromagnetic energy such as visible light, ultraviolet light, infrared light, or the like; exposure to acoustic energy; exposure to accelerated particles such as e-beam energy; contact with chemical curing agents such as by using peroxide initiation with styrene and/or a styrene mimetic; peroxide/amine chemistry; combinations of these; and the like. When curing of such functionality is initiated, crosslinking may proceed relatively rapidly so resultant coatings develop early green strength. Such curing typically proceeds substantially to completion under wide range of conditions to avoid undue levels of leftover reactivity.

In addition to free radically polymerizable functionality, the free radically polymerizable ingredient(s) incorporated into the free radically polymerizable component may include other kinds of functionality, including other types of curing functionality, functionality to promote particle dispersion, adhesion, scratch resistance, chemical resistance, abrasion resistance, combinations of these, and the like. For example, in addition to free radically polymerizable functionality, the free radically polymerizable ingredient(s) may also include additional crosslinkable functionality to allow the composition to form an interpenetrating polymer network upon being cured. One example of such other crosslinkable functionality includes OH and NCO groups, which are co-reactive to form urethane linkages. The reaction between OH and NCO often may be promoted by using a suitable crosslinking agent and catalyst. To help disperse particle additives, particularly ceramic particles, the ingredient(s) of the free radically polymerizable component may include pendant dispersant moieties such as acid or salt moieties of sulfonate, sulfate, phosphonate, phosphate, carboxylate, (meth)acrylonitrile, ammonium, quaternary ammonium, combinations of these, and the like. Other functionality can be selected to promote adhesion, gloss, hardness, chemical resistance, flexibility, and the like. Examples include epoxy, slime, siloxane, alkoxy, ester, amine, amide, urethane, polyester; combinations of these, and the like.

The one or more free radically polymerizable ingredients incorporated into the free radically polymerizable component may be aliphatic and/or aromatic. For outdoor applications, aliphatic materials tend to show better weatherability.

The one or more free radically polymerizable ingredients incorporated into the free radically polymerizable component may be linear, branched, cyclic, fused, combinations of these, or the like. For instance, branched resins may be utilized in some instances, as these resins may tend to have lower viscosity than linear counterparts of comparable molecular weight In those embodiments in which the fluidic materials are fluid dispersions, the free radically polymerizable component may function as at least a portion of the fluid carrier for particulate ingredients of the compositions. The fluidic materials are as solvent-free as practical such that the radiation curable component functions as substantially the entirety of the fluid carrier. Some free radically polymerizable ingredients may, by themselves, exist as solids at room temperature, but tend to be readily soluble in one or more of the other ingredients used to provide the free radically polymerizable component. When cured, the resultant matrix serves as a binder for the other ingredients of the composition.

Illustrative embodiments of radiation curable components desirably include a reactive diluent comprising one or more free radically polymerizable ingredients that have a weight average molecular weight under about 750, alternatively in the range from about 50 to about 750, alternatively from about 50 to about 500. The reactive diluent functions as a diluent, as an agent to reduce the viscosity of the fluidic material, as a coating binder/matrix when cured, as crosslinking agents, and/or the like.

The radiation curable component also optionally includes at least one free radically polymerizable resin in admixture with the reactive diluent. Generally, if the molecular weight of a resin is too large, the compositions may tend to be too viscous for easy handling. This also can impact the appearance of the resultant coating. On the other hand, if the molecular weight is too low, the toughness or resilience of the resultant compositions may suffer. It also can be more difficult to control film thickness, and the resultant coatings may tend to be more brittle than desired. Balancing these concerns, the term resin generally encompasses free radically polymerizable materials having a weight average molecular weight of about 750 or greater, alternatively from about 750 to about 20,000, alternatively about 750 to about 10,000, alternatively about 750 to about 5000, and alternatively about 750 to about 3000. Often, such one or more resins if solid by themselves at about room temperature are soluble in the reactive diluent so that the radiation curable component is a single, fluid phase. As used herein, molecular weight refers to weight average molecular weight unless otherwise expressly stated.

Desirably, the reactive diluent includes at least one ingredient that is mono functional with respect to free radically polymerizable functionality, at least one ingredient that is difunctional with respect to free radically polymerizable functionality, and at least one ingredient that is trifunctional or higher functionality with respect to free radically polymerizable functionality. Reactive diluents including this combination of ingredients help to provide cured coatings with excellent abrasion resistance while maintaining high levels of toughness.

Representative examples of monofunctional, free radically polymerizable ingredients suitable for use in the reactive diluent include styrene, alpha-methylstyrene, substituted styrene, vinyl esters, vinyl ethers, lactams such as N-vinyl-2-pyrrolidone, (meth)acrylamide, N-substituted (meth)acrylamide, octyl(meth)acrylate, nonylphenol ethoxylate(meth)acrylate, isononyl(meth)acrylate, 1,6-hexanediol(meth)acrylate, isobornyl(meth)acrylate, 2-(2-ethoxyethoxy)ethyl(meth)acrylate, 2-ethylhexyl(meth)acrylate, lauryl(meth)acrylate, beta-carboxyethyl(meth)acrylate, isobutyl(meth)acrylate, cycloaliphatic epoxide, alpha-epoxide, 2-hydroxyethyl(meth)acrylate, (meth)acrylonitrile, maleic anhydride, itaconic acid, isodecyl(meth)acrylate, dodecyl(meth)acrylate, n-butyl(meth)acrylate, methyl (meth)acrylate, hexyl(meth)acrylate, (meth)acrylic acid, N-vinylcaprolactam, stearyl(meth)acrylate, hydroxy functional caprolactone ester(meth)acrylate, octodecyl(meth) acrylate, isooctyl(meth)acrylate, hydroxyethyl(meth)acrylate, hydroxymethyl(meth)acrylate, hydroxypropyl(meth) acrylate, hydroxyisopropyl(meth)acrylate, hydroxybutyl (meth)acrylate, hydroxyisobutyl(meth)acrylate, tetrahydrofurfuryl(meth)acrylate, combinations of these, and the like. If one or more of such monofunctional monomers are present, these may comprise from 0.5 to about 50, alternatively 0.5 to 35, and alternatively from about 0.5 to about 25 weight percent of the radiation curable component based on the total weight of the free radically polymerizable component.

In some embodiments, a monofunctional component of the reactive diluent includes a lactam having pendant free radically polymerizable functionality and at least one other ingredient that is monofunctional with respect to free radical polymerizability. At least one of such additional monofunctional ingredients has a weight average molecular weight in the range of from about 50 to about 500. The weight ratio of the lactam to the one or more other monofunctional ingredients desirably is in the range from about 1:50 to 50:1, alternatively 1:20 to 20:1, alternatively about 2:3 to about 3:2. In one illustrative embodiment, using N-vinyl-2-pyrrolidone and octodecylacrylate at a weight ratio of about 1:1 would provide a suitable monofunctional component of the reactive diluent.

The di, tri, and/or higher functional constituents of the reactive diluent help to enhance one or more properties of the cured composition, including crosslink density, hardness, abrasion resistance, chemical resistance, scratch resistance, or the like. In many embodiments, these constituents may include from 0.5 to about 50, alternatively 0.5 to 35, and alternatively from about 0.5 to about 25 weight percent of the free radically polymerizable component based on the total weight of the free radically polymerizable component. Examples of such higher functional, radiation curable monomers include ethylene glycol di(meth)acrylate, hexanediol di(meth)acrylate, triethylene glycol di(meth)acrylate, tetraethylene glycol di(meth)acrylate, trimethylolpropane tri (meth)acrylate (TMPTA), ethoxylated trimethylolpropane tri(meth)acrylate, glycerol tri(meth)acrylate, pentaerythritol tri(meth)acrylate, pentaerythritol tetra(meth)acrylate, and neopentyl glycol di(meth)acrylate, 1,6 hexanediol di(meth) acrylate, dipentaerythritol penta(meth)acrylate, combinations of these, and the like. Additional free radically polymerizable monomers that would be suitable include those described in PCT Publication No. WO 02/077109.

In many embodiments, it is desirable if the reactive diluent includes at least one trifunctional or higher functionality material having a molecular weight in the range from about 50 to about 500 to promote abrasion resistance. The amount of such trifunctional or higher functionality materials used in the reactive diluent may vary over a wide range. In many desirable embodiments, at least about 15 weight percent, alternatively at least about 20 weight percent, at least about 25 weight percent, and even at least 45 weight percent of the reactive diluent is at least trifunctional or higher with respect to free radically polymerizable functionality based upon the total weight of the reactive diluent. These desirable embodiments incorporate an atypically high amount of tri- or higher functionality for increased crosslink density and corresponding high hardness and scratch resistance, but yet show excellent toughness.

Generally, one would expect that using so much crosslink density would obtain high hardness and scratch resistance at too much expense in terms of toughness and/or resilience. The conventional expectation would be that the resultant compositions to be too brittle to be practical. However, a relatively large content of tri- or higher functionality can be incorporated in the reactive diluent while still maintaining very good levels of toughness and resilience. As discussed below, in some embodiments the diluent materials may be combined along with performance enhancing free radically polymerizable resins, and various selected particles, including ceramic particles, organic particles, certain other additives, and combinations thereof.

The resultant free radically polymerizable components also have rheological properties to support relatively substantial particle distributions. This means that the free radically polymerizable component can be loaded to very high levels with particles and other additives that help to promote desirable characteristics such as scratch resistance, toughness, durability, and the like. In many embodiments, the composite mixture of the free radically polymerizable materials and the particle components may have pseudoplastic and thixotropic properties to help control and promote smoothness, uniformity, aesthetics, and durability of the resultant cured compositions. In particular, the desirable thixotropic properties help reduce particle settling after application. In other words, the free radically polymerizable component provides a carrier in which the particle distribution remains very stable during storage and after being applied onto a substrate (26). This stability includes helping to maintain particles at the substrate (26) to a large extent after application to the substrate (26). By maintaining particle populations at the substrate (26), high scratch resistance at the substrate (26) is maintained.

In some embodiments, at least one of the constituents of the reactive diluent optionally includes epoxy functionality in addition to free radically polymerizable functionality. In an illustrative embodiment, a diacrylate ingredient with a weight average molecular weight of about 500 to 700 and including at least one backbone moiety derived from epoxy functionality is incorporated into the reactive diluent. One example of such a material is commercially available under the trade designation CN120 from Sartomer Co., Inc. A blend containing 80 parts by weight of this oligomer with 20 parts by weight of TMPTA is also available from this source under the trade designation CN120080. In some embodiments, using from about 1 to about 25, alternatively about 8 to 20 parts by weight of this oligomer per about 1 to about 50 parts by weight, alternatively 5 to 20 parts by weight of the monofunctional constituents of the reactive diluent would be suitable. In an exemplary embodiment, using about 15 to 16 parts by weight of the CN120-80 admixture per about 12 parts by weight of monofunctional ingredients would be suitable.

In addition to the reactive diluent, a free radically polymerizable component may include one or more free radically polymerizable resins. When the free radically polymerizable component includes one or more free radically polymerizable resins, the amount of such resins incorporated into the compositions may vary over a wide range. As general guidelines the weight ratio of the free radically polymerizable resin(s) to the reactive diluent often may be in the range from about 1:20 to about 20:1, alternatively 1:20 to 1:1, alternatively 1:4 to 1:1, and alternatively about 1:2 to 1:1.

In illustrative embodiments, the free radically polymerizable resin component desirably includes one or more resins such as (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated(meth)acrylics, (meth) acrylated silicones, (meth)acrylated amines, (meth)acrylated amides; (meth)acrylated polysulfones; (meth)acrylated polyesters, (meth)acrylated polyethers (i.e., polyether (meth)acrylates), vinyl(meth)acrylates, and (meth)acrylated oils. In practice, referring to a resin by its class (e.g., polyurethane, polyester, silicone, etc.) means that the resin includes at least one moiety characteristic of that class even if the resin includes moieties from another class. Thus, a polyurethane resin includes at least one urethane linkage but also might include one or more other kinds of polymer linkages as well.

Representative examples of free radically polymerizable resin materials include radiation curable (meth)acrylates, urethanes and urethane (meth)acrylates (including aliphatic polyester urethane (meth)acrylates) such as the materials described in U.S. Pat. Nos. 5,453,451, 5,773,487 and 5,830,937. Additional free radically polymerizable resins that would be suitable include those described in PCT Publication No. WO 02/077109. A wide range of such materials are commercially available.

Embodiments of the resin component include at least a first free radically polymerizable polyurethane resin that has a glass transition temperature (Tg) of at least 50° C. and is at least trifunctional, alternatively at least tetrafunctional, alternatively at least pentafunctional, and alternatively at least hexafunctional with respect to free radically polymerizable functionality. This first resin desirably has a Tg of at least about 60° C., alternatively at least about 80° C., and alternatively at least about 100° C. In one mode of practice, a free radically polymerizable urethane resin having a Tg of about 50° C. to 60° C., and that is hexavalent with respect to (meth)acrylate functional would be suitable. An exemplary embodiment of such a hexafunctional resin is commercially available under the trade designation Genomer 4622 from Rahn.

In some embodiments, the first resin is used in combination with one or more other kinds of resins. Optionally, at least one of such other resins is also free radically polymerizable. For example, some embodiments incorporate the first resin in combination with at least a second free radically polymerizable resin that can be mono or multifunctional with respect to free radically polymerizable moieties. If present, the second free radically polymerizable resin can have a Tg over a wide range, such as from −30° C. to 120° C. In some embodiments, the second resin has a Tg of less than 50° C., alternatively less than about 30° C., and alternatively than about 10° C. Many embodiments of the second resin are polyurethane materials. An exemplary embodiment of such a resin is commercially available under the trade designation Desmolux U500 (formerly Desmolux XP2614) from Bayer MaterialSciencc AG.

Resins can be selected to achieve desired gloss objectives. For example, formulating a composition with a first free radically polymerizable resin having a relatively high Tg over about 50° C. in combination with an optional second free radically polymerizable resin having a relatively low Tg, such as below about 30° C., is helpful to provide coatings with mid-range gloss (e.g., about 50 to about 70) or high-range gloss (greater than about 70). Formulating with only one or more free radically polymerizable resins having a relatively higher Tg tends to be helpful to provide coatings with lower gloss (e.g., below about 50).

The weight ratio of the first and second resins may vary over a wide range. To provide coatings with excellent abrasion resistance and toughness with respect to embodiments in which the Tg of the second resin is under about 50° C., it is desirable if the ratio of the second, lower Tg resin to the first, higher Tg resin is in the range from about 1:20 to 20:1, alternatively less than 1:1, such as in the range from about 1:20 to about 1:1, alternatively about 1:20 to about 4:5, or alternatively about 1:20 to about 1:3. In one illustrative embodiment, a weight ratio of about 9:1 would be suitable.

An exemplary embodiment of a free radically polymerizable component comprising a reactive diluent with an atypically high content of trifunctional or higher functionality includes from about 1 to about 10, alternatively about 4 to about 8 parts by weight of a lactam such as N-vinyl-2-pyrrolidone, about 1 to about 10, alternatively about 2 to about 8 parts by weight of another monofunctional material having a molecular weight under about 500 such as octodecyl acrylate, about 5 to about 25, alternatively about 7 to about 30 parts by weight of a difunctional reactive diluent such as 1,6-hexane diacrylate; about 1 to about 8, alternatively about 2 to 5 parts by weight of a trifunctional reactive diluent having a molecular weight under about 500 such as trimethylol propane triacrylate TMPTA, about 1 to about 20 parts by weight of a trifunctional oligomer having a molecular weight in the range from about 500 to about 2000, about 1 to about 40 parts by weight of a difunctional oligomer having epoxy functionality and a molecular weight in the range from about 500 to about 2000, about 1 to about 15 parts by weight of the first resin, and about 1 to about 15 parts by weight of the second resin.

In alternative embodiments, the coating includes a first coat which provides a colored illustration, such as a pattern, by the application of colored coatings with the aid of the high transfer efficiency applicator. A second, transparent coat consisting of one or more covering layers (or top (30) coats) is superposed on this first coat for the purpose of protecting the first, colored coat.

In an embodiment, fluidic materials are employed, including, for example, pigments, oligomers, reactive diluents and other additives familiar to the person skilled in the art. Suitable pigments are, for example, Pigment Yellow 213, PY 151, PY 93, PY 83, Pigment Red 122, PR 168, PR 254, PR 179, Pigment Red 166, Pigment Red 48:2, Pigment Violet 19, Pigment Blue 15:1, Pigment Blue 15:3, Pigment Blue 15:4, Pigment Green 7, Pigment Green 36, Pigment Black 7 or Pigment White 6. Suitable oligomers are, for example, aliphatic and aromatic urethane acrylates, polyether acrylates and epoxyacrylates, which acrylates may optionally be monofunctional or polyfunctional, e.g. difunctional, trifunctional to hexafunctional, and decafunctional. Suitable reactive diluents are, for example, dipropylene glycol diacrylate, tripropylene glycol diacrylate, tetrahydrofurfuryl acrylate, isobornyl acrylate and isodecyl acrylate. Further additives may be added to the inks for adjustment of their properties, such as, for example, dispersant additives, antifoams, photoinitiators, and UV absorbers.

In an embodiment, covering layers are employed. Suitable covering layers are, for example, products based on single-component (1K) or two-component (2K) isocyanate crosslinking systems (polyurethanes) or based on 1K or 2K epoxy systems (epoxy resins). In certain embodiments, 2K systems are employed. The covering layer employed according to the invention can be transparent or translucent.

In two-component isocyanate crosslinking systems, isocyanates such as, for example, oligomers based on hexamethylene diisocyanate (HDI), diphenylmethane diisocyanate (MDI), isophorone diisocyanate (IPDI), or toluidine diisocyanate (TDI), e.g. isocyanurates, biuret, allophanates, and adducts of the isocyanates mentioned with polyhydric alcohols and mixtures thereof are employed as the curing component. Polyols such as, for example, OH group-containing polyesters, polyethers, acrylates and polyurethane, and mixtures thereof, are employed as the binding component, which polyols may be solvent-based, solvent-free, or water-dilutable.

In two-component epoxy systems, epoxy resins such as, for example, glycidyl ethers of bisphenols such as bisphenol A or bisphenol F and epoxidized aliphatic parent substances, and mixtures thereof, are employed as the binding component. NH-functional substances such as, for example, amines, amides and adducts of epoxy resins and amines, and mixtures thereof, are employed as the curing component.

In the case of polyol-containing binders, customary commercial isocyanate curing agents and in the case of epoxy resin-containing binders, NH-functional curing agents can be employed as the curing component.

The mixing ratios of the binder and curing components are selected such that the weights of the respective components, in each case based on the amount of substance of the reactive groups, are present in an OH:NCO or epoxy:NH ratio in the range of from 1:0.7 to 1:1.5, alternatively from 1:0.8 to 1:1.2 or alternatively 1:1.

A 3-layer coating can be employed in various industrial sectors. The basecoat is formed by primers that can be applied to wood, metal, glass, and plastics materials. Examples of suitable primers for use are products based on single-component (1K) or two-component (2K) isocyanate crosslinking systems (polyurethanes) or based on 1K or 2K epoxy systems (epoxy resins).

As introduced above, the fluidic material may further include pigment. Any pigment known in the art for use in fluidic materials may be utilized in the fluidic material. Non-limiting examples of suitable pigments include metallic oxides, metal hydroxide, effect pigments including metal flakes, chromates, such as lead chromate, sulfides, sulfates, carbonates, carbon black, silica, talc, china clay, phthalocyanine blues and greens, organo reds, organo maroons, pearlescent pigments, other organic pigments and dyes, and combinations thereof. If desired, chromate-free pigments, such as barium metaborate, zinc phosphate, aluminum triphosphate and combinations thereof, can also be utilized.

Further non-limiting examples of suitable effect pigments include bright aluminum flake, extremely fine aluminum flake, medium particle size aluminum flake, and bright medium coarse aluminum flake; mica flake coated with titanium dioxide pigment also known as pearl pigments; and combinations thereof. Non-limiting examples of suitable colored pigments include titanium dioxide, zinc oxide, iron oxide, carbon black, mono azo red toner, red iron oxide, quinacridone maroon, transparent red oxide, dioxazine carbazole violet, iron blue, indanthrone blue, chrome titanate, titanium yellow, mono azo permanent orange, ferrite yellow, mono azo benzimidazolone yellow, transparent yellow oxide, isoindoline yellow, tetrachloroisoindoline yellow, anthanthrone orange, lead chromate yellow, phthalocyanine green, quinacridone red, perylene maroon, quinacridone violet, pre-darkened chrome yellow, thio-indigo red, transparent red oxide chip, molybdate orange, molybdate orange red, and combinations thereof.

The fluidic material may further include extender pigments. While extender pigments are generally utilized to replace higher cost pigments in fluidic materials, the extender pigments as contemplated herein may increase shear viscosity of the fluidic material as compared to a fluidic material free of the extender pigments. An increase in shear viscosity of the fluidic material may improve suitability of the fluidic material for application to the substrate (26) utilizing the nozzle plate (20). The extender pigment may have a particle size of from about 0.01 to about 44 microns. The extender pigment may have a variety of configurations including, but not limited to, nodular, platelet, acicular, and fibrous. Non-limiting examples of suitable extender pigments include whiting, barytes, amorphous silica, fumed silica, diatomaceous silica, china clay, calcium carbonate, phyllosilicate (mica), wollastonite, magnesium silicate (talc), barium sulfate, kaolin, and aluminum silicate.

The fluidic material may include the extender pigment in an amount of from about 0.1 to about 50, alternatively from about 1 to about 20, or alternatively from about 1 to about 10, wt. %, based on a total weight of the fluidic material. In certain embodiments, the fluidic material includes magnesium silicate (talc), barium sulfate, or a combination thereof. In various embodiments, inclusion of barium sulfate as the extender pigment results in a fluidic material having greater shear viscosity as compared to inclusion of talc as the extender pigment.

The fluidic material may further include dyes. Non-limiting examples of suitable dyes include triphenylmethane dyes, anthraquinone dyes, xanthene and related dyes, azo dyes, reactive dyes, phthalocyanine compounds, quinacridone compounds, and fluorescent brighteners, and combinations thereof. The fluidic material may include the dye in an amount of from about 0.01 to about 5, alternatively from about 0.05 to about 1, or alternatively from about 0.05 to about 0.5, wt. %, based on a total weight of the fluidic material. In certain embodiments, the fluidic material includes a 10% black dye solution, such as Sol. Orasol Negro RL.

The fluidic material may further include rheology modifiers. Many different types of rheology modifiers can be used in fluidic materials may be utilized in the fluidic material. For example, a rheology modifier can be used that may increase rheology of the fluidic material as compared to a fluidic material free of the rheology modifier. An increase in rheology of the fluidic material may improve suitability of the fluidic material for application to the substrate (26) utilizing the nozzle plate (20). Non-limiting examples of suitable rheology modifiers include urea-based compounds, laponite propylene glycol solutions, acrylic alkali emulsions, and combinations thereof. The fluidic material may include the rheology modifier in an amount of from about 0.01 to about 5, alternatively from about 0.05 to about 1, or alternatively from about 0.05 to about 0.5, wt. %, based on a total weight of the fluidic material. In certain embodiments, the fluidic material includes the laponite propylene glycol solution, the acrylic alkali emulsion, or a combination thereof. The laponite propylene glycol solution includes a synthetic layered silicate, water, and polypropylene glycol. The synthetic layered silicate is commercially available from Altana AG of Wesel, Germany under the trade name Laponite RD. The acrylic alkali emulsion is commercially available from BASF Corporation of Florham Park, New Jersey under the tradename Viscalex® HV 30.

The fluidic material may further include organic solvents. In embodiments, the fluidic material is a solventborne fluidic material when the organic solvent content is greater than about 50 wt. %, alternatively greater than 60 wt. %, alternatively greater than 70 wt. %, alternatively greater than 80 wt. %, or alternatively greater than 90 wt. %, based on a total weight of liquid carrier in the fluidic material. Non-limiting examples of suitable organic solvents can include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate, and a combination thereof. In embodiments, the evaporation rate of the solvent may have an impact on the suitability of the fluidic material for printing. Certain co-solvents may be incorporated into the fluidic material having increased or decreased evaporation rates thereby increasing or decreasing the evaporation rate of the fluidic material.

The fluidic material may further include water. In embodiments, the fluidic material is a waterborne fluidic material when the water content is greater than about 50 wt. %, alternatively greater than 60 wt. %, alternatively greater than 70 wt. %, alternatively greater than 80 wt. %, or alternatively greater than 90 wt. %, based on a total weight of liquid carrier in the fluidic material. The fluidic material may have a pH of from about 1 to about 14, alternatively from about 5 to about 12, or alternatively from about 8 to about 10.

The fluidic material may further include a catalyst. The fluidic material may further include a catalyst to reduce curing time and to allow curing of the fluidic material at ambient temperatures. The ambient temperatures are typically referred to as temperatures in a range of from 18° C. to 35° C. Non-limiting examples of suitable catalysts may include organic metal salts, such as, dibutyl tin dilaurate, dibutyl tin diacetate, dibutyl tin dichloride, dibutyl tin dibromide, zinc naphthenate; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts and other catalysts, or a combination thereof. Non-limiting examples of suitable acid catalysts may include carboxylic acids, sulfonic acids, phosphoric acids or a combination thereof. In some embodiments, the acid catalyst can include, for example, acetic acid, formic acid, dodecyl benzene sulfonic acid, dinonyl naphthalene sulfonic acid, para-toluene sulfonic acid, phosphoric acid, or a combination thereof. The fluidic material may include the catalysts in an amount of from about 0.01 to about 5, alternatively from about 0.05 to about 1, or alternatively from about 0.05 to about 0.5, wt. %, based on a total weight of the fluidic material.

The fluidic material may further include conventional additives. The fluidic material may further include an ultraviolet light stabilizer. Non-limiting examples of such ultraviolet light stabilizers include ultraviolet light absorbers, screeners, quenchers, and hindered amine light stabilizers. An antioxidant can also be added to the fluidic material. Typical ultraviolet light stabilizers can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals of Tarrytown, New York, under the trade name Tinuvin®, can be utilized.

Non-limiting examples of suitable ultraviolet light absorbers include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2 [2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)-1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Non-limiting examples of suitable hindered amine light stabilizers include N-(1,2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'"-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N, N'-dibutyl-N', N'"-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl) [3,5bis(1,1-dimethylethyl-4-hydroxy-phenyl)methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-21-oxo-7-oxa-3,20-diazal dispiro(5.1.11.2)henicosan-20-yl) propionate.

Non-limiting examples of suitable antioxidants include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-C7-C9 branched alkyl esters. In certain embodiments, the antioxidant includes hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168 from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals, and Doverphos® S-9228 from Dover Chemicals.

The fluidic materials may further include other additives known in the art for use in fluidic materials. Non-limiting examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective trade names, leveling agents based on (meth)acrylic homopolymers; rheological control agents; thickeners, such as partially crosslinked polycarboxylic acid or polyurethanes; and antifoaming agents. The other additives can be used in conventional amounts familiar to those skilled in the art. In embodiments, the wetting agents, leveling agents, flow control agents, and surfactants of the fluidic material can affect the surface tension of the fluidic material and thus may have an impact on the suitability of the fluidic material for printing. Certain wetting agents, leveling agents, flow control agents, and surfactants may be incorporated into the fluidic material for increasing or decreasing the surface tension of the fluidic material.

Depending upon the type of crosslinking agent, the fluidic material of this invention can be formulated as one-pack (1K) or two-pack (2K) fluidic material. One-pack fluidic materials may be air-dry coatings or un-activated coatings. The term "air-dry coating" or "un-activated coating" refers to a coating that dries primarily by solvent evaporation and does not require crosslinking to form a coating film having desired properties. If polyisocyanates with free isocyanate groups are used as the crosslinking agent, the fluidic material can be formulated as a two-pack fluidic material in that the crosslinking agent is mixed with other components of the fluidic material only shortly before coating application. If blocked polyisocyanates are, for example, used as the crosslinking agent, the fluidic materials can be formulated as a one-pack (1K) fluidic material.

"Two-pack fluidic material" or "two component fluidic material" means a thermoset fluidic material comprising two components stored in separate containers. These containers are typically sealed to increase the shelf life of the components of the fluidic material. The components are mixed prior to use to form a pot mix. The pot mix is applied as a layer of desired thickness on a substrate (26), such as an automobile body or body parts. After application, the layer is cured under ambient conditions or bake cured at elevated temperatures to form a coating on the substrate (26) having desired coating properties, such as high gloss, smooth appearance, and durability.

The fluidic material may have a solids content of from about 5 to about 90, alternatively from 5 to about 80, or alternatively about 15 to about 70, wt. %. The solids content may be determined in accordance with ASTM D2369-10. In certain embodiments, the higher solids content for the fluidic material may be desired due to the fluidic material not undergoing atomization utilizing conventional equipment.

The fluidic material may include a primary or color giving pigment in an amount of from about 0.1 to about 30 weight % (wt. %), alternatively from about 0.5 wt. % to about 20 wt. %, or alternatively from about 1 wt. % to about 10 wt. %, based on a total weight of the fluidic material.

The fluidic material may include the binder in an amount of from about 5 to about 70 wt. %, alternatively from about 10 to about 50 wt. %, or alternatively from about 15 to about 25 wt. %, based on a total weight of the fluidic material.

The fluidic material may include a crosslinker in an amount of from about 1 to about 20 wt. %, alternatively from about 2 to about 10 wt. %, or alternatively from about 4 to about 6 wt. %, based on a total weight of the fluidic material.

The fluidic material may be substantially free of a dye. The term "substantially" as utilized herein means that the fluidic material may include insignificant amounts of dye such that the color and/or properties of the fluidic material are not impacted by the addition of the insignificant amount of the dye which still being considered substantially free of a dye. In embodiments, the fluidic material being substantially free of a dye includes no greater than 5 wt. %, alternatively no greater than 1 wt. %, or alternatively no greater than 0.1 wt. %.

The fluidic material may include one or more pigments. Non-limiting examples of suitable primary pigments include pigments with coloristic properties useful in the present invention including: blue pigments including indanthrone blue Pigment Blue 60, phthalocyanine blues, Pigment Blue 15:1, 15:, 15:3 and 15:4, and cobalt blue Pigment Blue 28; red pigments including quinacridone reds, Pigment Red 122 and Pigment Red 202, iron oxide red Pigment Red 101, perylene reds scarlet Pigment Red 149, Pigment Red 177, Pigment Red 178, and maroon Pigment Red 179, azoic red Pigment Red 188, and diketo-pyrrolopyrrol reds Pigment red 255 and Pigment Red 264; yellow pigments including diarylide yellows Pigment Yellow 14, iron oxide yellow Pigment Yellow 42, nickel titanate yellow Pigment Yellow 53, indolinone yellows Pigment Yellow 110 and Pigment Yellow 139, monoazo yellow Pigment yellow 150, bismuth vanadium yellow pigment Yellow 184, disazo yellows Pigment Yellow 128 and Pigment Yellow 155; orange pigments including quinacridone orange pigments Pigment Yellow 49 and Pigment Orange 49, benzimidazolone orange pigment Orange 36; green pigments including phthalocyanine greens Pigment Green 7 and Pigment Green 36, and cobalt green Pigment Green 50; violet pigments including quinacridone violets Pigment Violet 19 and Pigment Violet 42, dioxane violet Pigment Violet 23, and perylene violet Pigment Violet 29; brown pigments including monoazo brown Pigment Brown 25 and chrome-antimony titanate Pigment Brown 24, iron chromium oxide Pigment Brown 29; white pigments such as anatase and rutile titanium dioxide ($TiO_2$) Pigment White 6; and black pigments including carbon blacks Pigment Black 6 and Pigment Black 7, perylene black Pigment Black 32, copper chromate black Pigment Black 28. Alternatively, effect pigments such as metallic flake pigments, mica-containing pigments, glass-containing pigments, and combinations thereof may be included. Functional pigments such as radar reflective pigment, LiDAR reflective pigment, corrosion inhibiting pigment, and combinations thereof may also be included.

The fluidic material may also include a functional additive to improve properties of the fluidic material. The functional additive may be chosen from anti-sag agents, pH modifiers, catalysts, surface tension modifiers, solubility modifiers, adhesion promoters, and combinations thereof.

If the fluidic material is used to form a coating layer, the coating layer is not particularly limited. For example, in one embodiment, the coating layer may have a solvent resistance of at least 5 double MEK rubs, alternatively at least 20 double MEK rubs, or alternatively at least 20 double MEK rubs, on a nonporous substrate (26) in accordance with ASTM D4752. The coating layer may have a film tensile modulus of at least 100 MPa, alternatively at least 100 MPa, or alternatively at least 200 MPa, in accordance with ASTM 5026-15. The coating layer formed from the fluidic material including a crosslinker may have a crosslink density of at least 0.2 mmol/$cm^3$, alternatively at least 0.5 mmol/$cm^3$, or alternatively at least 1.0 mmol/$cm^3$, in accordance with ASTM D5026-15. The coating layer may have a gloss value of at least 75, alternatively at least 88, or alternatively at least 92, at a 20 degree specular angle in accordance with ASTM 2813. The coating layer may have a gloss retention of at least 50%, alternatively at least 70%, or alternatively at least 90%, of the initial gloss value after 2000 hours of weathering exposure in accordance with ASTM D7869.

Referring now to the substrate (26), the substrate (26) is not particularly limited and may be any known in the art. In various embodiments, the substrate (26) may include a metal-containing material, a plastic-containing material, or a combination thereof. In certain embodiments, the substrate (26) is substantially non-porous. The term "substantially" as utilized herein means that at least 95%, at least 96%, at least 97%, at least 98%, at least 99% of a surface of the coating layer is free of pores. The fluidic material may be utilized to coat any type of substrate (26) known in the art. In embodiments, the substrate (26) is a vehicle, automobile, or automobile vehicle. "Vehicle" or "automobile" or "automobile vehicle" includes an automobile, such as, car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport. The fluidic material may also be utilized to coat substrates (26) in industrial applications such as buildings; fences; ceramic tiles; stationary structures; bridges; pipes; cellulosic materials (e.g., woods, paper, fiber, etc.). The fluidic material may also be utilized to coat substrates (26) in consumer products applications such as helmets; baseball bats; bicycles; and toys. It is to be appreciated that the term "substrate" as utilized herein can also refer to a coating layer disposed on an article that is also considered a substrate (26).

In various non-limiting embodiments, the disclosure of the following references are hereby expressly incorporated herein by reference both alone and in combination with one or more of each other:

Glass Wafer Mechanical Properties: A Comparison To Silicon; Authors: Dr. Gary R. Trott and Dr. Aric Shorey; Corning Incorporated, Corning, New York 14831;

Effect of Nozzle Length on Breakup Length of Liquid Jet; Memoirs Of The School Of Engineering, Okayama University, Vol. 4, No. 1, September 1969;

US2004/0217202;

Multi Nozzle Electrohydrodynamic Inkjet Printing Head By Batch Fabrication; MEMS 2013, Taipei, Taiwan, January 20-24, 2013; and Capabilities and Limits to Form High Aspect-Ratio Microstructures by Molding of Borosilicate Glass; Journal Of Microelectromechanical Systems, Vol. 28, No. 3, June 2019.

It is also contemplated that all combinations of the aforementioned components, structures, chemistries, method steps, etc. described herein and/or in any of the references incorporated by reference herein, are expressly contemplated for use herein in various non-limiting embodiments even if they are not described in the same paragraph or relative to a single embodiment. Moreover, it is contemplated that all values herein, even if not expressly designated as such, may be considered to be exact or approximate values, e.g. ±0.1, 0.5, 1, 2, 3, 4, 5, 6, 7, 8, 9, or 10%, in various non-limiting embodiments. Furthermore, in various non-limiting embodiments, all values and ranges of values, both whole and fractional, including and between those described in all paragraphs above are hereby expressly contemplated for use.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A nozzle plate defining at least one nozzle connected to the nozzle plate at a base, wherein the at least one nozzle has a height and a top having an inner width and an outer width, wherein a ratio of said height to said inner width is greater than 5, and wherein said nozzle plate comprises a borosilicate glass.

2. The nozzle plate of claim 1, wherein the ratio of said height to said inner width is from about 8 to about 10.

3. The nozzle plate of claim 1, wherein said top is approximately circular such that said inner width is approximately defined as an inner diameter and said outer width is approximately defined as an outer diameter.

4. The nozzle plate of claim 3, wherein said inner diameter is from about 0.03 mm to about 0.12 mm.

5. The nozzle plate of claim 1, wherein the nozzle plate consists essentially of the borosilicate glass.

6. The nozzle plate of claim 1, wherein the nozzle plate consists of the borosilicate glass.

7. A coating apparatus for dispensing a fluidic material, said coating apparatus comprising:

the nozzle plate of claim 1;

a positioning mechanism operationally attached to said nozzle plate, wherein said positioning mechanism is adapted to operate with a plurality of degrees of freedom;

at least one fluid dispensing conduit operationally coupled to said nozzle plate and to a supply of fluidic material wherein said fluidic material is dispensed via said nozzle plate; and a control mechanism operationally coupled to said positioning mechanism, wherein said control mechanism is adapted to control said positioning mechanism to position said nozzle plate and wherein said control mechanism determines a flow of fluidic material to said nozzle plate.

8. A method of making a nozzle plate, said method comprising the steps of:

providing a silicon wafer having a surface;

providing a borosilicate glass wafer having a surface;

etching the surface of the silicon wafer to form a plurality of trenches in the surface;

anodically bonding the etched surface of the silicon wafer to the surface of the borosilicate glass wafer to form a two layer composite;

heating the two layer composite at a temperature of at least about 750° C. to soften the borosilicate glass wafer to a molten state such that molten borosilicate glass flows into the plurality of trenches to form a plurality of nozzles; and releasing the silicon wafer from the borosilicate glass to form the nozzle plate having the plurality of nozzles, wherein the nozzle plate defines at least one nozzle connected to the nozzle plate at a base, wherein the at least one nozzle has a height and a top having an inner width and an outer width, wherein a ratio of the height to the inner width is greater than about 3, and wherein the nozzle plate comprises a borosilicate glass.

9. The method of claim 8, wherein the ratio of the nozzle height to the inner width is from about 8 to about 10.

10. The method of claim 8, wherein the top is approximately circular such that the inner width is approximately defined as an inner diameter and the outer width is approximately defined as an outer diameter.

11. The method of claim 10, wherein the inner diameter is from about 0.03 mm to about 0.12 mm.

12. A method of jetting a fluidic material through a nozzle plate and onto a substrate, the method comprising the steps of:

providing a nozzle plate defining at least one nozzle connected to the nozzle plate at a base, wherein the at least one nozzle has a height and a top having an inner width and an outer width, wherein a ratio of the height to the inner width is greater than about 3, and wherein the nozzle plate comprises a borosilicate glass; and jetting the fluidic material through the at least one nozzle to form a jet of the fluidic material that contacts the substrate disposed at a distance (D) from the nozzle;

wherein the jet has a breakup length that is greater than the distance (D) such that the jet does not break apart into individual droplets before contacting the substrate.

13. The method of claim 12, wherein the ratio of the height to the inner width is from about 3 to about 10.

14. The method of claim 12, wherein the top is approximately circular such that the inner width is approximately defined as an inner diameter and the outer width is approximately defined as an outer diameter.

15. The method of claim 12, wherein said step of jetting comprises applying an electrostatic charge to the fluidic material.

* * * * *